US010051242B2

(12) United States Patent
Joe

(10) Patent No.: US 10,051,242 B2
(45) Date of Patent: Aug. 14, 2018

(54) VISUAL POSITIONING WITH DIRECTION ORIENTATION NAVIGATION SYSTEM

(71) Applicant: Tobby Joe, Hacienda Heights, CA (US)

(72) Inventor: Tobby Joe, Hacienda Heights, CA (US)

(73) Assignee: Evan Joe, City of Industry, CA (US)

( * ) Notice: Subject to any disclaimer, the term of this patent is extended or adjusted under 35 U.S.C. 154(b) by 63 days.

(21) Appl. No.: 14/209,978

(22) Filed: Mar. 13, 2014

(65) Prior Publication Data
US 2014/0307093 A1 Oct. 16, 2014

Related U.S. Application Data

(60) Provisional application No. 61/852,320, filed on Mar. 15, 2013.

(51) Int. Cl.
H04N 7/18 (2006.01)
B60R 1/12 (2006.01)
B60R 1/08 (2006.01)
B60R 1/00 (2006.01)
B60W 30/00 (2006.01)
G01C 21/36 (2006.01)

(52) U.S. Cl.
CPC ............. H04N 7/18 (2013.01); B60R 1/00 (2013.01); B60R 1/082 (2013.01); B60R 1/12 (2013.01); B60W 30/00 (2013.01); G01C 21/3658 (2013.01); B60R 2001/1253 (2013.01); B60R 2300/8046 (2013.01); B60R 2300/8066 (2013.01)

(58) Field of Classification Search
CPC ...................................................... H04N 7/18
See application file for complete search history.

(56) References Cited

U.S. PATENT DOCUMENTS 4,277,142 A 7/1981 Gardner
4,490,013 A 12/1984 Pribis
(Continued)

FOREIGN PATENT DOCUMENTS

CH 648521 3/1985
CN 1727991 A 2/2006
(Continued)

OTHER PUBLICATIONS

PCT Search Report and Written Opinion for PCT/US2014/020929 dated Jul. 3, 2014, in 16 pages.
(Continued)

Primary Examiner — James Pontius
(74) Attorney, Agent, or Firm — Innovation Capital Law Group, LLP; Vic Lin

(57) ABSTRACT

A visualization system is provided for permitting a driver of a vehicle to observe a 180 degree rearward view of his or her vehicle and surroundings. The visualization system can include a display device which provides a 180 degree substantially rearward view. The 180 degree substantially rearward view can be seamless and/or undistorted. The display device can be positioned within the vehicle in front of the driver. The display device can be mounted on the inside surface of a windshield of the vehicle. At least a portion of the display device can be positioned above the eyes of the driver of the vehicle when the driver is seated in the driver's seat of the vehicle.

27 Claims, 10 Drawing Sheets

(56) References Cited

U.S. PATENT DOCUMENTS

| | | | | |
|---|---|---|---|---|
| 4,674,850 | A | * | 6/1987 | Blom ............... B29D 11/00596 |
| | | | | 248/478 |
| 5,127,700 | A | * | 7/1992 | Joe ........................ B60R 1/082 |
| | | | | 296/97.5 |
| 5,289,321 | A | | 2/1994 | Secor |
| 5,321,556 | A | * | 6/1994 | Joe ........................ B60R 1/082 |
| | | | | 248/479 |
| 6,498,620 | B2 | | 12/2002 | Schofield et al. |
| 8,120,653 | B2 | | 2/2012 | Schmidt et al. |
| 2005/0146607 | A1 | | 7/2005 | Linn et al. |
| 2005/0190260 | A1 | | 9/2005 | Kie |
| 2008/0231703 | A1 | | 9/2008 | Nagata et al. |
| 2008/0288136 | A1 | * | 11/2008 | Itatsu .................. G07C 5/0891 |
| | | | | 701/32.6 |
| 2009/0290019 | A1 | | 11/2009 | McNellis et al. |
| 2010/0253593 | A1 | | 10/2010 | Seder et al. |
| 2010/0321497 | A1 | | 12/2010 | Onishi et al. |
| 2012/0154591 | A1 | * | 6/2012 | Baur ........................ B60R 1/00 |
| | | | | 348/148 |
| 2012/0262580 | A1 | | 10/2012 | Huebner et al. |
| 2013/0155533 | A1 | * | 6/2013 | Hunter .................... B62J 29/00 |
| | | | | 359/842 |

FOREIGN PATENT DOCUMENTS

| | | |
|---|---|---|
| CN | 2900242 Y | 5/2007 |
| CN | 101442618 | 5/2009 |
| CN | 201395104 | 2/2010 |
| FR | 2934535 | 2/2010 |
| GB | 2490131 | 10/2012 |
| JP | 2001/086492 | 3/2001 |
| JP | 2009/100261 | 5/2009 |
| WO | WO 85/05191 A1 | 11/1985 |
| WO | WO 2006/093073 A1 | 9/2006 |

OTHER PUBLICATIONS

Final Office Action dated Feb. 24, 2016 from related U.S. Appl. No. 14/210,021, 16 pages.

China Office Action dated Nov. 8, 2016 from counterpart Chinese Patent Application No. 201480023838.0.

Extended European Search Report dated Nov. 2, 2016 from corresponding European Application No. 14770496.9, 6 pages.

Office Action dated Sep. 15, 2016 from related U.S. Appl. No. 14/210,021, 9 pages.

Office Action dated Dec. 29, 2017 from related U.S. Appl. No. 14/210,021.

* cited by examiner

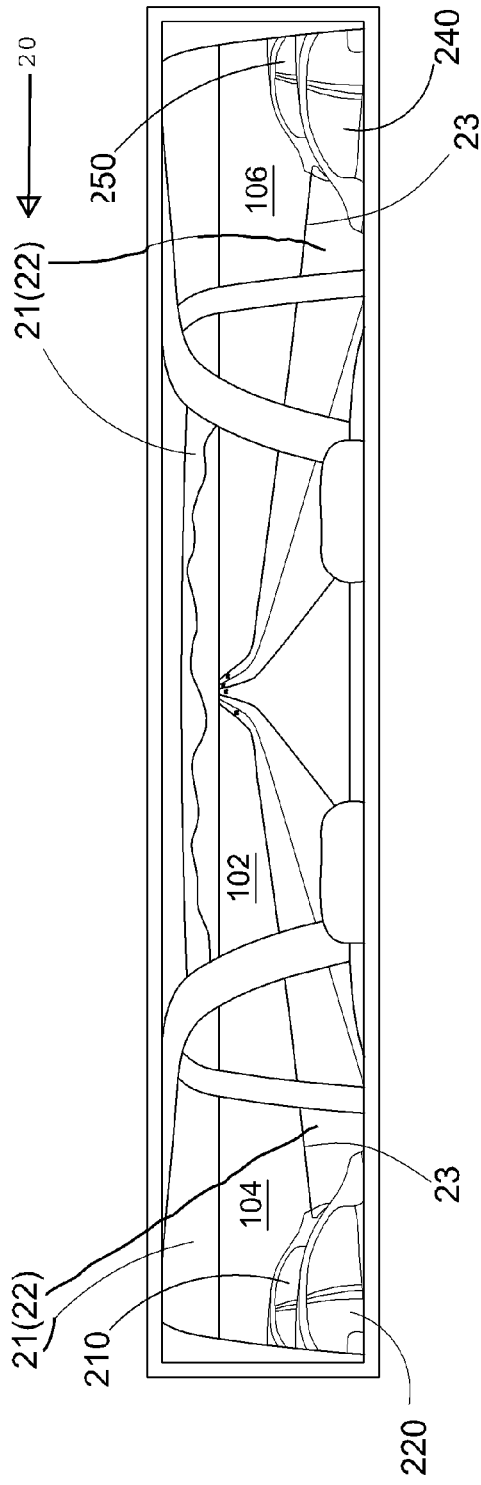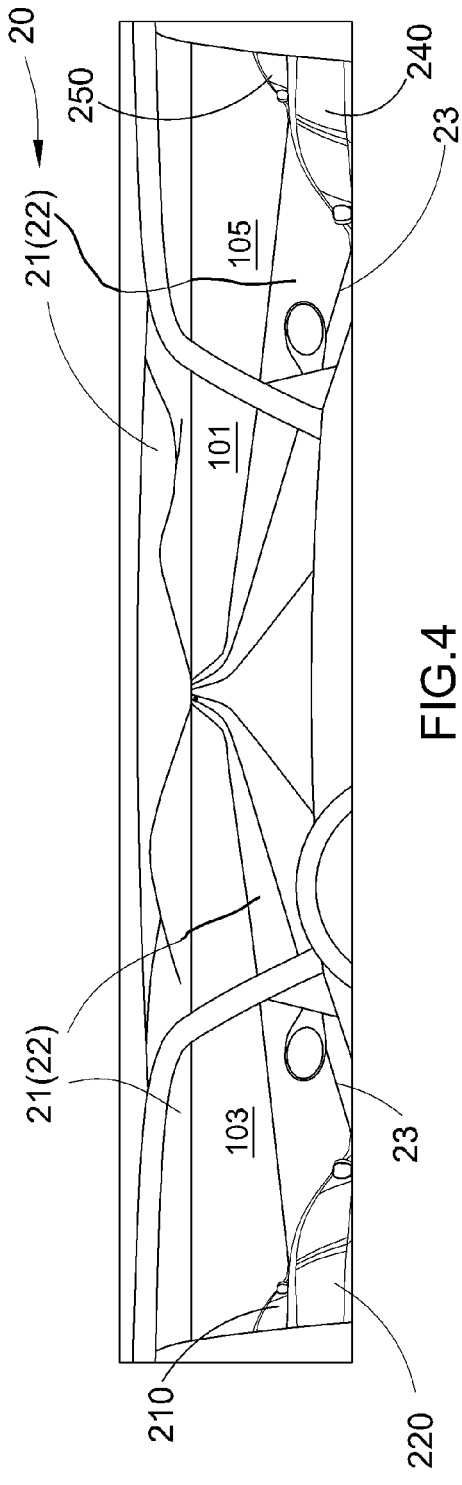

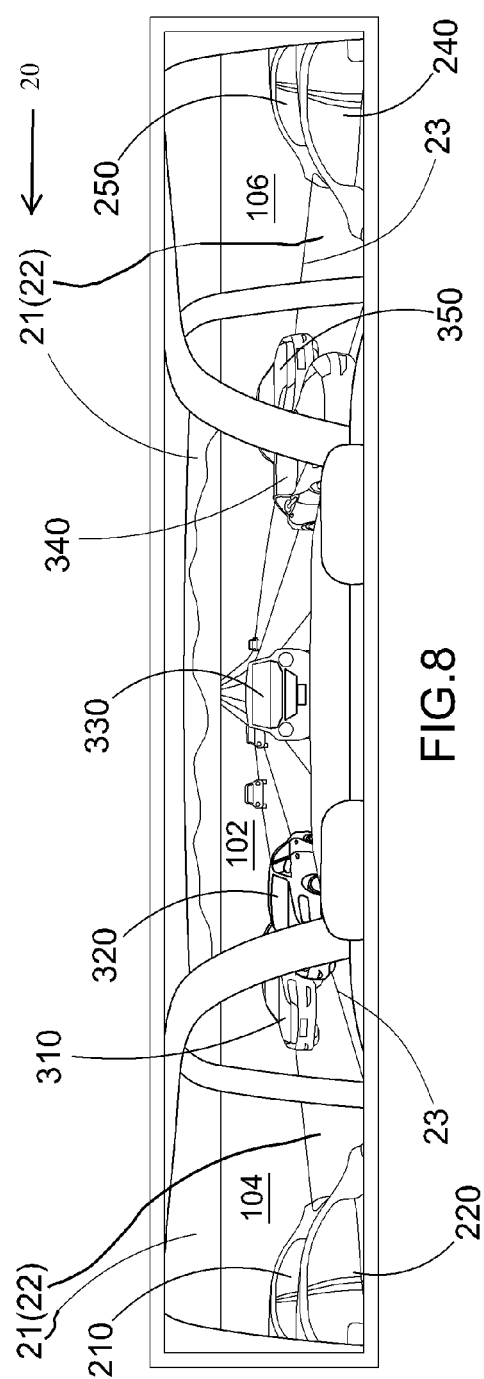
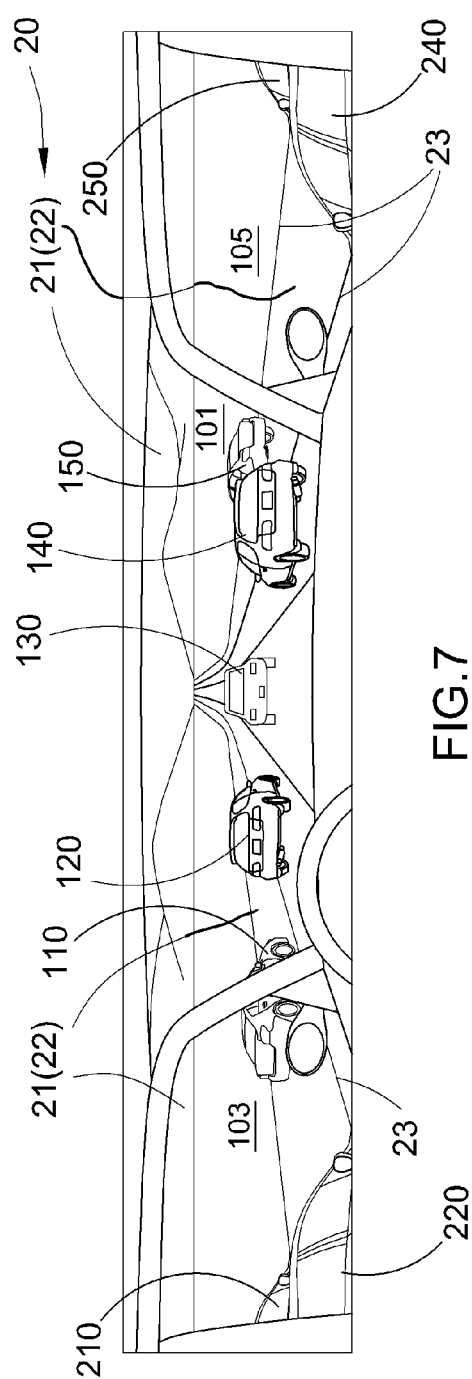

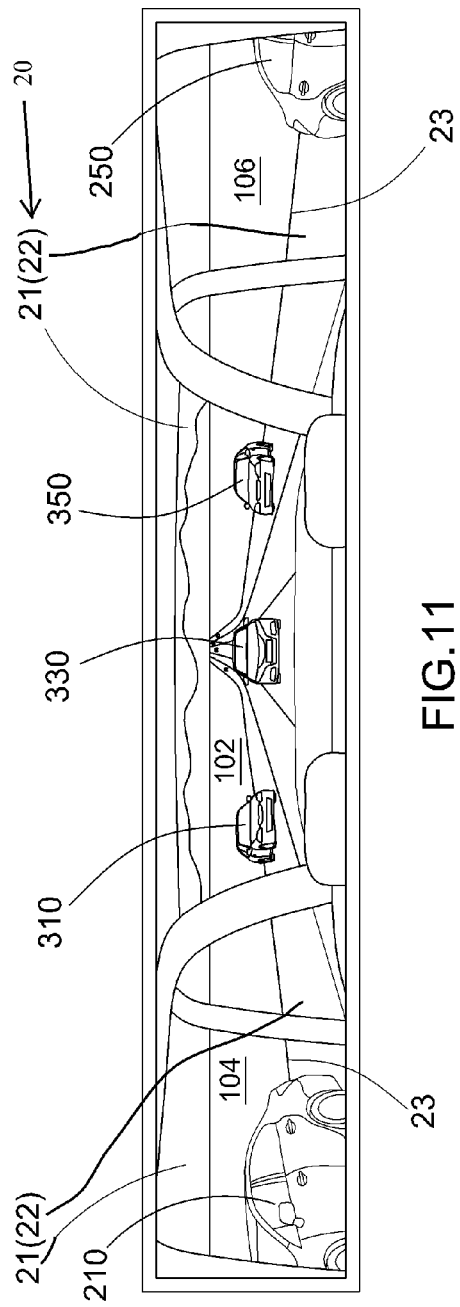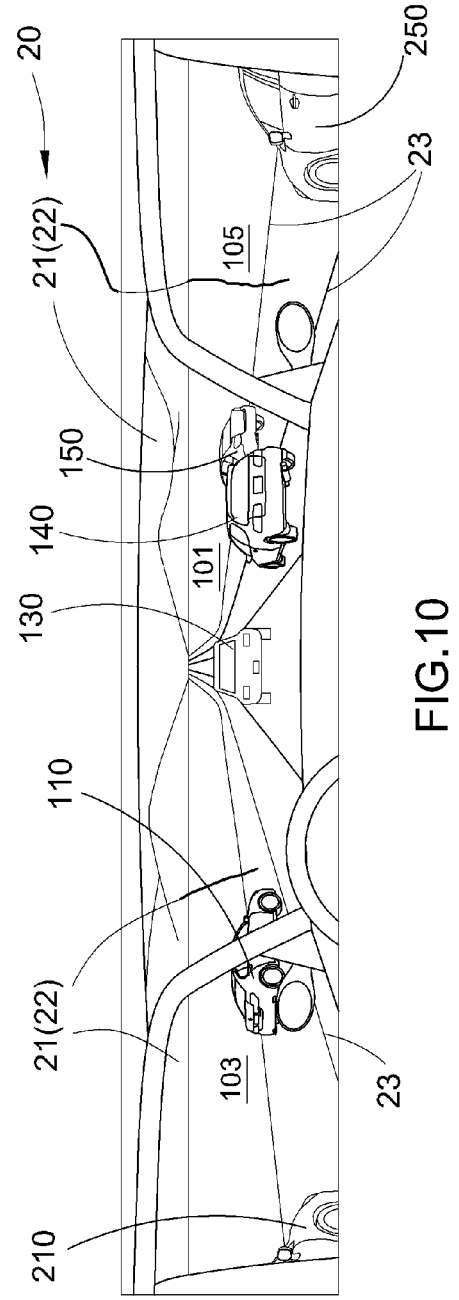

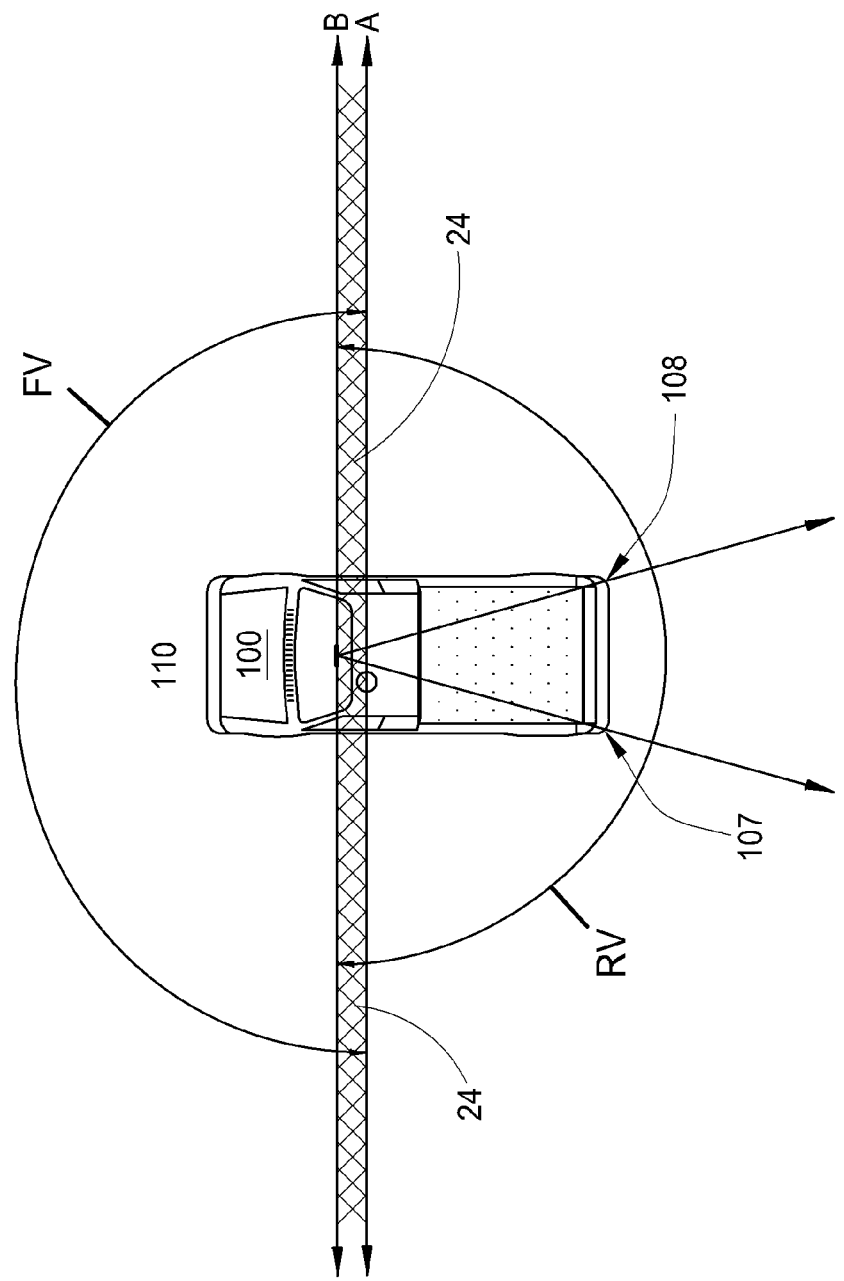

VISUAL POSITIONING WITH DIRECTION ORIENTATION NAVIGATION SYSTEM

CROSS-REFERENCE TO RELATED APPLICATIONS

This application claims benefit under 35 U.S.C. 119(e) to U.S. Provisional Patent Application No. 61/852,320, filed Mar. 15, 2013, the entire disclosure of which is hereby incorporated by reference herein in its entirety. Any and all priority claims identified in the Application Data Sheet, or any corrections thereto, are hereby incorporated by reference under 37 CFR 1.57.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

TECHNICAL FIELD

The present disclosure relates to devices, systems, and methods for providing navigational aid to a driver of a vehicle (e.g., automobiles, farming equipment, industrial equipment, aircraft, trains, recreational vehicles, buses, semi-trailer trucks, construction equipment, motorcycles, bicycles, watercraft, golf carts, and/or other motorized or non-motorized vehicles).

DESCRIPTION OF THE RELATED ART

Since 1911, rear view mirrors have been fitted to motor vehicles. Rear view mirrors are traditionally planar and provide only a limited rearward view. Side mirrors have also been used on vehicles to supplement the rearward view provided by the rear view mirrors. However, drivers must divert their eyes from the roadway in front of them to use the side mirrors.

SUMMARY

The devices and systems of the present disclosure desirably can provide a 180-degree-rear-view. In some embodiments, the devices and systems of the present disclosure provide a seamless 180-degree-rear-view. The 180-degree-rear-view can be combined with a 180-degree-forward-view to form a 360-degree-field-of-view for the driver of a vehicle. The devices and systems of the present disclosure can provide a driver of a vehicle with a full view of the surroundings of his or her vehicle and can eliminate blind spots from the view of the driver.

The 180-degree full rearward field-of-view displayed in an embodiment of a mirror of the present disclosure teaches a field-of-view common to the driver's seamless 180-degree full forward field-of-view. In some embodiments, the mirror's view desirably automatically extends into the area of the driver's vision in the driver's forward field-of-view which naturally duplicates the same scene in the driver's forward field-of-view, which enables the driver to see the same vehicle with the naked eye and through the mirror at the same time, such that the driver sees the vehicle in his forward field-of-view. A signature image may result whereby the driver sees the vehicle as it passes, e.g., the driver sees the vehicle in the side windows before the vehicle leaves the rear window, and in the driver's peripheral-vision-line before the vehicle leaves the side windows of the driver's vehicle through the mirror by positioning with direction, and not by distancing.

Accordingly, the driver is desirably able to precisely track and pinpoint the position and direction of the driver's vehicle and the position and direction of each and every other moving vehicle around the driver's vehicle in order to visually maintain and adjust a driver's vehicle position and direction properly and safely relative to the positions and directions of moving vehicles surrounding the driver's vehicle without judging distance for safe driving.

The present disclosure provides a method of creating a 360 degree full awareness driving environment for a driver of a vehicle. The method can include displaying a 180 degree rearward view (e.g., a seamless view) in front of the driver at an interior of a driver's vehicle. In some embodiments, the method includes blending the seamless 180 degree rearward view with a seamless 180 degree forward view of the driver to form a seamless 360 degree full awareness driving view that can teach a field-of-view common with respect to the driver. The method can include determining an orientation, location, and position (e.g., with direction) of the driver's vehicle from the driver's perspective in relation with (e.g., in relation with the location and position with direction of) one or more moving vehicles surrounding the driver's vehicle.

In some embodiments, a visualization system for a vehicle includes a display device attached to a portion of the vehicle in front of a driver viewing position. The display device can have a width. In some embodiments, the display device has a height less than a height of the windscreen of the vehicle. The display device can have a display portion facing the driver viewing position. In some cases, from the driver viewing position, the display device displays an at least 180° substantially rearward view. In some cases, the at least 180° substantially rearward view of the environment rearward of the display device overlaps an at least 180° forward view from the driver viewing position.

In some cases, the visualization system includes an image capturing device attached to a portion of the vehicle, the image capturing device configured to capture a 180° seamless view of an environment rearward of the display device. In some embodiments, the image capturing device is connected to the display device. In some cases, the image capturing device is a camera. In some embodiments, the display device is a convex mirror. In some instances, the rearward view is seamless. In some embodiments, the rearward view is undistorted. In some cases, the at least 180° substantially rearward view is perpendicular to a centerline of the vehicle. In some embodiments, the display device is attached to the windscreen of the vehicle.

In some embodiments, from the driver viewing position, the display device is configured to display at least one driving lane on a left side of the vehicle and at least one driving lane on a right side of the vehicle. In some cases, from the driver viewing position, the display device is configured to display at least two driving lanes on the left side of the vehicle behind the display and at least two driving lanes on the right side of the vehicle behind the display. In some embodiments, from the driver viewing position, the display device is configured to display a position and a direction of travel of vehicles behind and adjacent to the vehicle to which the display device is attached. In some embodiments, it is safe for the driver to move the driver's vehicle into a target position in an adjacent lane when no other vehicle is shown in the display, from the driver viewing position, to be positioned in or to be entering into the target position in the adjacent lane. In some cases, from the driver viewing position, the display device displays: a right rearward view defined between a right edge of a rear window of the vehicle as displayed in the display device and a viewing direction rightward of and lateral to the display device; a left rearward view defined between a left edge of a rear window of the vehicle as displayed in the display device and a viewing direction leftward of and lateral to the display device; and a rearward driving perspective view between the left rearward view and the right rearward view.

According to some variants, a visualization system for a vehicle can include a convex mirror attached to a portion of the vehicle in front of a driver viewing position. The convex mirror can have a width. In some embodiments, the convex mirror has a height less than a height of the windscreen of the vehicle. In some cases, the convex mirror has a reflective surface facing the driver viewing position. The reflective surface can display an at least 180° view of an environment substantially rearward of the display device from the driver viewing position.

In some instances, the view is seamless. In some cases, the view is undistorted. In some embodiments, the convex mirror has a constant radius of curvature. In some cases, the convex mirror is mounted to an interior of the windscreen of the vehicle. In some embodiments, the convex mirror is mounted above the driver viewing position.

According to some variants, a visualization system for a vehicle includes a display device inside of the vehicle. The display device can have a width. In some instances, the display device has a height less than a height of the windscreen of the vehicle. The display device can have a display portion facing a driver viewing position.

In some cases the display portion displays an at least 180° rearward view rearward of the display device from the driver viewing position. In some embodiments, the at least 180° rearward view of the environment rearward of the display device overlaps an at least 180° forward view from the driver viewing position forward of the driver viewing position. In some instances, the at least 180° rearward view of the environment lateral to and rearward of the display device is seamless. In some embodiments, the at least 180° rearward view of the environment lateral to and rearward of the display device is undistorted. In some cases, the display device is positioned in front of the driver viewing position. In some embodiments, the at least 180° rearward view rearward of the display device includes a view of the driver of the vehicle. In some instances, the at least 180° rearward view rearward of the display device includes a portion of the interior of the vehicle.

According to some variants, a method of preventing collisions between a vehicle and its surrounds includes attaching a display device to portion of a vehicle in front of a driver viewing position, the display device having a height less than a height of a windscreen of the vehicle and a width. In some cases, the method includes orienting the display device to produce an at least 180° substantially rearward view of the environment substantially rearward of the display device from the driver viewing position. In some embodiments, the at least 180° substantially rearward view of the environment rearward of the display device and an at least 180° substantially forward view from the driver viewing position forward of the viewing point together form a 360° driving view. In some cases, the rearward view is undistorted. In some instances, the rearward view is seamless. In some embodiments, the display device is a convex mirror.

A method of creating a seamless 360 degree full awareness driving environment for a driver, can include the steps of: displaying a seamless 180 degree full rearward view in front of the driver at an interior of a driver's vehicle; blending the seamless 180 degree full rearward view with a seamless 180 degree full forward view of the driver to form a seamless 360 degree full awareness driving view with respect to the driver; and through the seamless 360 degree full awareness driving view, determining an orientation, location, and position of the driver's vehicle by positioning from the driver's perspective in relation with one or moving vehicles surrounding the driver's vehicle, such that the driver is able to precisely track and pinpoint the position and direction of driver's vehicle and the position and direction of each and every other moving vehicle around the driver's vehicle in order to visually maintain and adjust a driver's vehicle position and direction properly and safely relative to the positions and directions of the moving vehicles surrounding the driver's vehicle for safe driving.

In some embodiments, blending the seamless 180 degree full rearward view with a seamless 180 degree full forward view of the driver further comprises a step of forming an overlapped vision portion for the seamless 360 degree full awareness driving view when blending the seamless 180 degree full rearward view with the seamless 180 degree full forward view, such that when the moving vehicle appears at the overlapped vision portion, the moving vehicle is visible at both of the seamless 180 degree full rearward view and the seamless 180 degree full forward view.

In some embodiments, displaying a seamless 180 degree full rearward view further comprises a step of defining a left rearward field-of-view, a rear rearward field-of-view, and a right rearward field-of-view to form the seamless 180 degree full rearward view. In some instances, the overlapped vision portion contains a left overlapped portion formed at an overlapped area between the left rearward field-of-view and a left forward field-of-view of the seamless 180 degree full forward view, and a right overlapped portion formed at an overlapped area between the right rearward field-of-view and a right forward field-of-view of the seamless 180 degree full forward view.

In some cases, determining an orientation, location, and position of the driver's vehicle further comprises a step of defining an orientation guideline in the seamless 180 degree full rearward view by a body structure of the driver's vehicle for preventing the driver from getting lost in the seamless 360 degree full awareness driving environment. In some embodiments, determining an orientation, location, and position of the driver's vehicle further comprises a step of defining an orientation guideline in the seamless 180 degree full rearward view by a body structure of the driver's vehicle for preventing the driver from getting lost in the seamless 360 degree full awareness driving environment. In some instances, determining an orientation, location, and position of the driver's vehicle further comprises a step of defining a location guideline in the seamless 180 degree full rearward view by the body structure of the driver's vehicle for identifying each and every moving vehicle's location in the seamless 360 degree full awareness driving environment. In some cases, determining an orientation, location, and position of the driver's vehicle further comprises a step of defining a location guideline in the seamless 180 degree full rearward view by the body structure of the driver's vehicle for identifying each and every moving vehicle's location in the seamless 360 degree full awareness driving environment. In some embodiments, determining an orientation, location, and position of the driver's vehicle further comprises a step of defining a position guideline in the seamless 180 degree full rearward view by lane separation lines for pinpointing each and every moving vehicle's position, including the driver's vehicle position within a known location. In some cases, determining an orientation, location, and position of the driver's vehicle further comprises a step of defining a position guideline in the seamless 180 degree full rearward view by lane separation lines for pinpointing each and every moving vehicle's position, including the driver's vehicle position within a known location.

In some cases, for a car, the orientation guideline and the position guideline are defined by rear left window, rear windshield, and rear right window displayed at the seamless 180 degree full rearward view. In some instances, for a car, the orientation guideline and the position guideline are defined by rear left window, rear windshield, and rear right window displayed at the seamless 180 degree full rearward view. In some cases, for a convertible car with a top rolled down or a pickup truck, the orientation guideline and the position guideline are defined by rear left and right corners of the vehicle displayed at the seamless 180 degree full rearward view. In some embodiments, for a convertible car with a top rolled down or a pickup truck, the orientation guideline and the position guideline are defined by rear left and right corners of the vehicle displayed at the seamless 180 degree full rearward view.

In some embodiments, the seamless 180 degree full rearward view is displayed as an image reflected by an interior mirror. In some cases, the seamless 180 degree full rearward view is displayed as an image reflected by an interior mirror. In some instances, the seamless 180 degree full rearward view is displayed as an image reflected by an interior mirror. In some cases, the interior mirror is a mirror selected from the group consisting of constant radius of curvature convex mirror, multiple radii of curvature convex mirror, aspheric mirror, and mirror with curved surfaces, and a U-shape plane mirror formed by one seamless plane mirror plate. In some embodiments, the interior mirror is a mirror selected from the group consisting of constant radius of curvature convex mirror, multiple radii of curvature convex mirror, aspheric mirror, and mirror with curved surfaces, and a U-shape plane mirror formed by one seamless plane mirror plate.

A visual positioning orientation navigation system for a driver's vehicle can comprise: a display adapted for mounting at an interior of the vehicle at a position in front of a driver thereof, the display displaying a seamless 180 degree full rearward view for being viewed by the driver in the driver's vehicle and for blending with a seamless 180 degree full forward view of the driver to form a seamless 360 degree full awareness driving view with respect to the driver; and a guidance arrangement shown in the seamless 180 degree full rearward view at the display for determining an orientation, location, and position of the driver's vehicle by positioning from the driver's perspective in relation with one or moving vehicles surrounding the driver's vehicle; wherein the driver is able to precisely track and pinpoint the position of driver's vehicle and the position of each and every other moving vehicle around the driver's vehicle in order to visually maintain and adjust a driver's vehicle position properly and safely relative to the positions of moving vehicles surrounding the driver's vehicle for safe driving.

In some cases, the guidance arrangement contains an overlapped vision portion for the seamless 360 degree full awareness driving view when blending the seamless 180 degree full rearward view with the seamless 180 degree full forward view, such that the overlapped vision portion is adapted for enabling the moving vehicle being visible at both of the seamless 180 degree full rearward view and the seamless 180 degree full forward view when the moving vehicle appears at the overlapped vision portion. In some instances, the seamless 180 degree full rearward view is configured to include a left rearward field-of-view, a rearward driving perspective field-of-view, and a right rearward field-of-view. In some embodiments, the seamless 180 degree full rearward view is configured to include a left rearward field-of-view, a rearward driving perspective field-of-view, and a right rearward field-of-view, wherein the overlapped vision portion contains a left overlapped portion formed at an overlapped area between the left rearward driving view and a left forward driving view of the seamless 180 degree full forward view, and a right overlapped portion formed at an overlapped area between the right rearward driving view and a right forward driving view of the seamless 180 degree full forward view.

In some cases, the guidance arrangement contains an orientation guideline shown in the seamless 180 degree full rearward view as an image of a body structure of the driver's vehicle for preventing the driver from getting lost in the seamless 360 degree full awareness driving environment. In some embodiments, the guidance arrangement contains an orientation guideline shown in the seamless 180 degree full rearward view as an image of a body structure of the driver's vehicle for preventing the driver from getting lost in the seamless 360 degree full awareness driving environment. In some instances, the guidance arrangement contains a location guideline shown in the seamless 180 degree full rearward view as an image of the body structure of the driver's vehicle for identifying each and every moving vehicle's location in the seamless 360 degree full awareness driving environment.

In some embodiments, the guidance arrangement contains a location guideline shown in the seamless 180 degree full rearward view as an image of the body structure of the driver's vehicle for identifying each and every moving vehicle's location in the seamless 360 degree full awareness driving environment. In some cases, the guidance arrangement contains a position guideline shown in the seamless 180 degree full rearward view as images of lane separation lines for pinpointing each and every moving vehicle's position, including the driver's vehicle position within a known location. In some instances, the guidance arrangement contains a position guideline shown in the seamless 180 degree full rearward view as images of lane separation lines for pinpointing each and every moving vehicle's position, including the driver's vehicle position within a known location.

In some cases, the orientation guideline and the position guideline are defined by rear left window, rear windshield, and rear right window displayed at the seamless 180 degree full rearward view. In some embodiments, the orientation guideline and the position guideline are defined by rear left window, rear windshield, and rear right window displayed at the seamless 180 degree full rearward view. In some instances, the orientation guideline and the position guideline are defined by rear left and right corners of the vehicle displayed at the seamless 180 degree full rearward view.

In some embodiments, the orientation guideline and the position guideline are defined by rear left and right corners of the vehicle displayed at the seamless 180 degree full rearward view. In some instances, the display comprises an interior mirror to display the seamless 180 degree full rearward view as an image reflection. In some cases, the display comprises an interior mirror to display the seamless 180 degree full rearward view as an image reflection.

In some instances, the display comprises an interior mirror to display the seamless 180 degree full rearward view as an image reflection. In some cases, the interior mirror is a mirror selected from the group consisting of constant radius of curvature convex mirror, multiple radii of curvature convex mirror, aspheric mirror, and mirror with curved surfaces, and a U-shape plane mirror formed by one seamless plane mirror plate. In some embodiments, the interior mirror is a mirror selected from the group consisting of constant radius of curvature convex mirror, multiple radii of curvature convex mirror, aspheric mirror, and mirror with curved surfaces, and a U-shape plane mirror formed by one seamless plane mirror plate.

In some cases, the interior mirror is a mirror selected from the group consisting of constant radius of curvature convex mirror, multiple radii of curvature convex mirror, aspheric mirror, and mirror with curved surfaces, and a U-shape plane mirror formed by one seamless plane mirror plate. In some embodiments, the display comprises an interior image capturer capturing the seamless 180 degree full rearward view in live manner and a display means for displaying the seamless 180 degree full rearward view from the interior image capturer. In some instances, the display comprises an interior image capturer capturing the seamless 180 degree full rearward view in live manner and a display means for displaying the seamless 180 degree full rearward view from the interior image capturer.

BRIEF DESCRIPTION OF THE DRAWINGS

These and other features and advantages of the present embodiments will become more apparent upon reading the following detailed description and with reference to the accompanying drawings of the embodiments, in which:

FIG. 4 illustrates a seamless 180 degree full forward view of the driver in relation to the moving vehicles in the overlapped vision portion illustrated in FIG. 3.

FIG. 5 illustrates a 180 degree full rearward view of the driver in relation to the moving vehicles in the overlapped vision portion illustrated in FIG. 3.

FIG. 7 illustrates a seamless 180 degree full forward view of the driver in relation to the moving vehicles surrounding the driver's vehicle in FIG. 6.

FIG. 8 illustrates a 180 degree full rearward view of the driver in relation with the moving vehicles surrounding the driver's vehicle in FIG. 6.

FIG. 10 illustrates the seamless 180 degree full forward view of the driver in relation to the moving vehicles at the overlapped vision portion in FIG. 9.

FIG. 11 illustrates the 180 degree full rearward view of the driver in relation to the moving vehicles at the overlapped vision portion in FIG. 9.

FIG. 12 illustrates another 360 degree full awareness driving view with respect to the driver of a pickup truck or convertible when a 180 degree full rearward view blends with a seamless 180 degree full forward view of the driver.

DETAILED DESCRIPTION OF CERTAIN PREFERRED EMBODIMENTS

The present disclosure provides a visualization system for a vehicle (e.g., a visual positioning system which provides directional orientation). The visual positioning system can include rear view (e.g., a view in the direction of the rear of the vehicle from a point in front of the rear of the vehicle) technology. The rear view technology of the present disclosure can provide a visual system for a driver of a vehicle that is advantageous over a multi-mirror-system design. For example, the rear view technology of the present disclosure can provide the driver of the vehicle a view of the surroundings of the vehicle (e.g., a 360 degree view) while minimizing eye distraction which is present with a conventional multi-mirror system.

Figure 1:
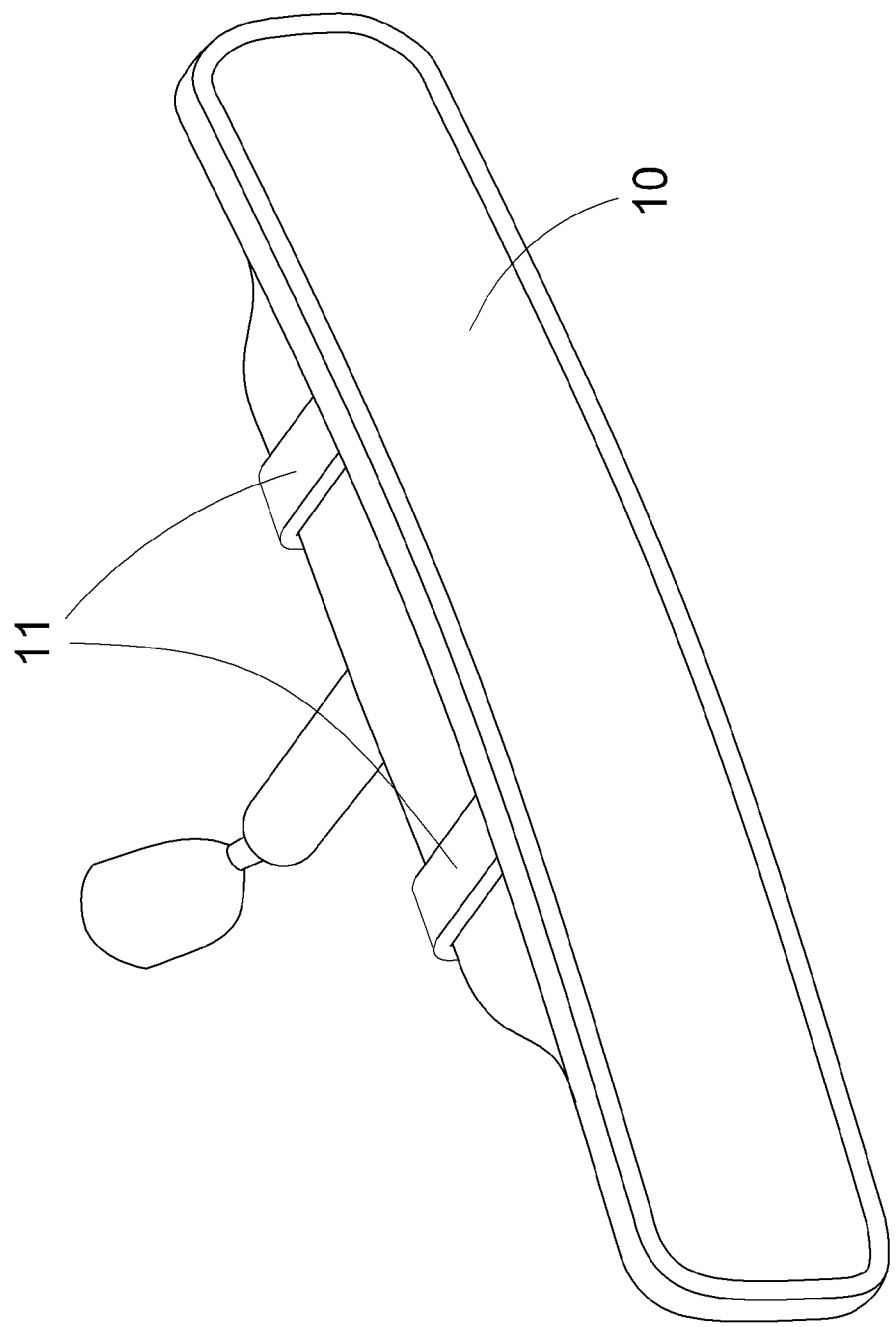
FIG. 1 is a perspective view of an embodiment of a visual positioning with direction orientation navigation system.

As illustrated in FIG. 1, a visualization system can include a display 10. The display 10 can be supported in front of the driver (e.g., in front of the position of the eyes of the driver within the vehicle). According to a preferred embodiment, the display 10 is adapted for mounting at an interior of the vehicle 100 at a position in front of and above the eyes of the driver thereof. In some embodiments, the display 10 is adjustably mounted to the interior of the vehicle 100. In some embodiments, the display 10 is mounted below the eyes of the driver.

The display 10 can be mounted via a mounting assembly 11. The mounting assembly 11 can be a detachable rear view mirror clip-on assembly, as shown in FIG. 1. Preferably, the display 10 is located above the eye level of the driver when the driver is seated in a driving position of the vehicle (e.g., the driver's seat). In some embodiments, the mounting assembly 11 can include a suction cup or other windshield mount detachably mountable to the windshield of the vehicle 100. In some embodiments, the display 10 can be a replacement of a conventional rear view mirror. For example, the mounting assembly 11 can comprise a mounting base mounted at an area of a windshield where a conventional rear view mirror is mounted. The display 10 can be used in different types of vehicles including, but not limited to, automobiles, trucks, lorries, buses, tractors, forklifts, cranes, backhoes, bulldozers, golf carts, all-terrain vehicles, other off-road vehicles, motorcycles, bicycles, boats, trains, aircrafts and the like.

The display 10 can display a 180 degree rearward view from the perspective of a single viewing point within the vehicle. For example, the driver of a vehicle can observe a 180 degree rearward view in the display 10 without moving his or her viewing position. In certain embodiments, the display 10 can display a 180 degree rearward view from the perspective of a driver viewing position. The driver viewing position can be defined as the midpoint between a driver's eyes when the driver of the vehicle is seated in the driver's seat of a vehicle. In some embodiments, the driver viewing position is laterally (e.g., left and right with respect to the sides of the vehicle) aligned with a centerline of a steering wheel of the vehicle.

In some embodiments, the 180 degree rearward view provided by the display 10 is seamless (e.g., without breaks and/or without distortions). Desirably, the rearward view of the display 10 includes a view of the driver position and, when the driver is sitting in the car, a view of the driver. The display 10 can be positioned in the vehicle such that the 180 degree rearward view provided by the display 10 blends with a 180 degree forward (e.g., toward the front of the vehicle from behind the front of the vehicle) view of the driver of the vehicle to form the 360 degree driving view (e.g., a seamless 360 degree driving view in cases where the 180 degree rearward view is seamless) with respect to the driver. For example, the display 10 can be positioned in front and above the eyes of the driver of the vehicle in which the display 10 is mounted. According to a preferred embodiment, as shown in FIG. 1, the display 10 can be an interior mirror. Examples of mirrors that can be used as the display 10 include, but are not limited to non-planar mirrors such as the constant radius of curvature convex mirrors, multiple radii of curvature convex mirrors, aspheric mirrors, the combination feature of those mirrors, mirrors with curved surfaces, planar mirrors such as the U-shape plane mirror formed by one seamless plane mirror plate, planar mirrors formed by multiple plane mirror plates, and/or any combination of non-planar mirrors and planar mirrors. The 180 degree rearward view can be an image reflected on the display 10.

The display 10 can have a width greater than 3 inches, greater than 6 inches, greater than 10 inches, greater than 20 inches, greater than 36 inches, and/or greater than 72 inches. In some embodiments, the display 10 have a width less than 6 inches, less than 20 inches, less than 40 inches, less than 60 inches, and/or less than 90 inches. In some embodiments, the width of the display 10 is between 4 inches and 85 inches. The display 10 can have a height greater than ½ inches, greater than 1 inch, greater than 3 inches, greater than 6 inches, and/or greater than 10 inches. In some embodiments, the display has a height less than 20 inches, less than 15 inches, less than 12 inches, less than 6 inches, and/or less than 2 inches. In some embodiments, the height of the display 10 is between 1 inch and 12 inches. In some cases, the display 10 can have a radius of curvature between 5 inches and 600 inches. Many variations for the dimensions of the display 10 are possible.

Figure 2:
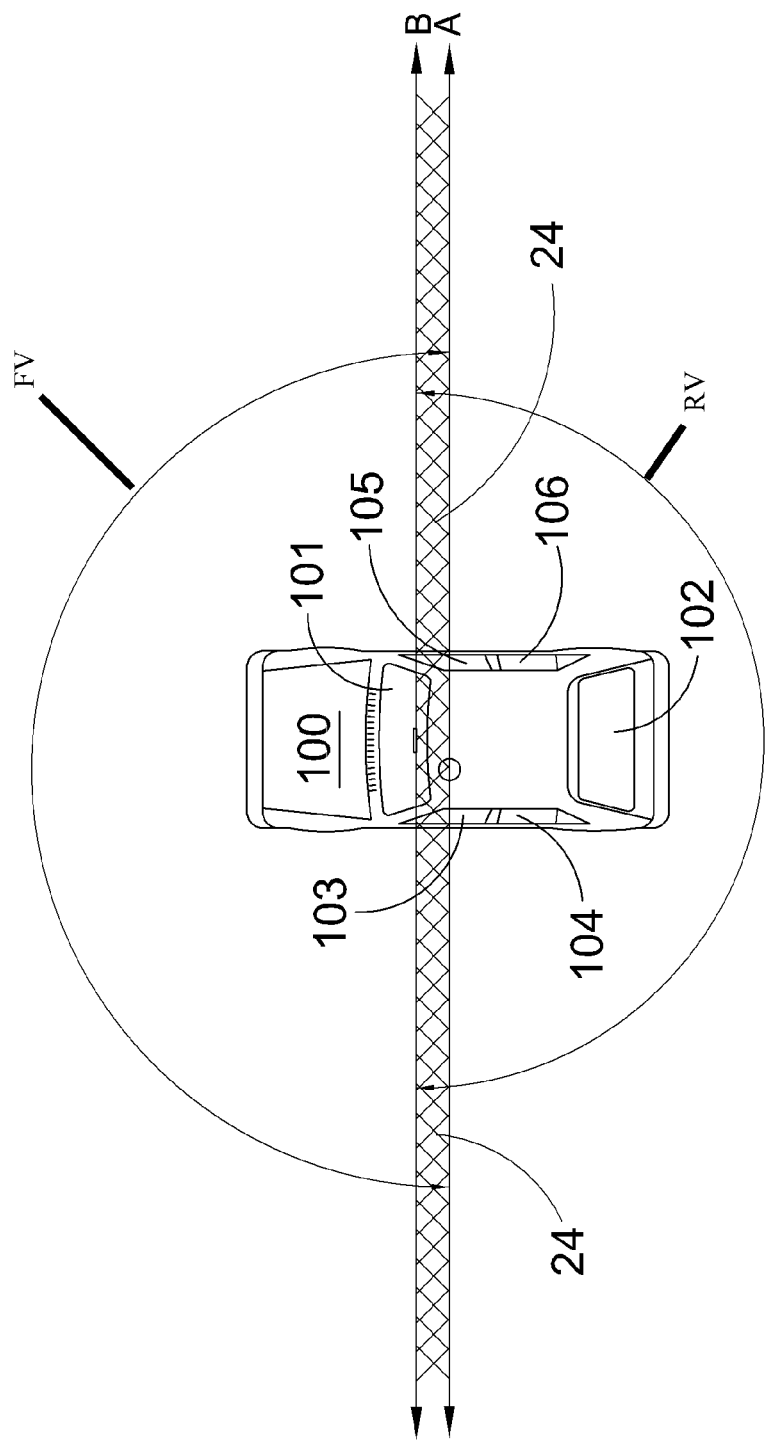
FIG. 2 illustrates a 360 degree full awareness driving view with respect to the driver when a 180 degree full rearward view blends with a seamless 180 degree full forward view of the driver.

As illustrated in FIG. 2, the vehicle 100, such as a car, can comprise a front windshield 101, left and right side windows, and a rear windshield 102. In particular, the left side windows can be further defined as a front left side window 103 and a rear left side window 104. The right side windows can be further defined as a front right side window 105 and a rear right side window 106.

Figure 3:
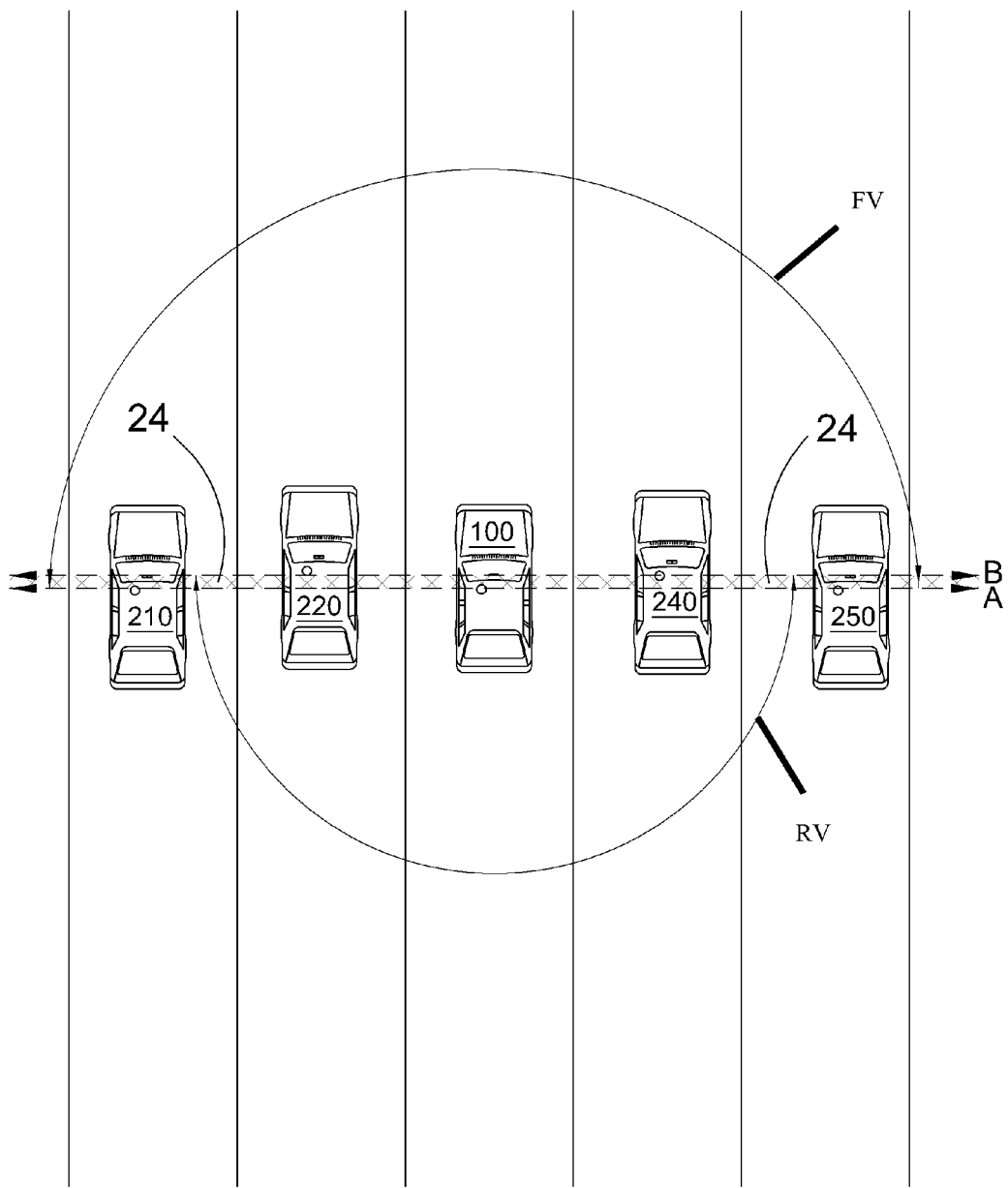
FIG. 3 illustrates a map of roadway in relation to the 360 degree full awareness driving view of FIG. 2, illustrating moving vehicles appearing in an overlapped vision portion of the 360 degree full awareness driving view.
Figure 6:
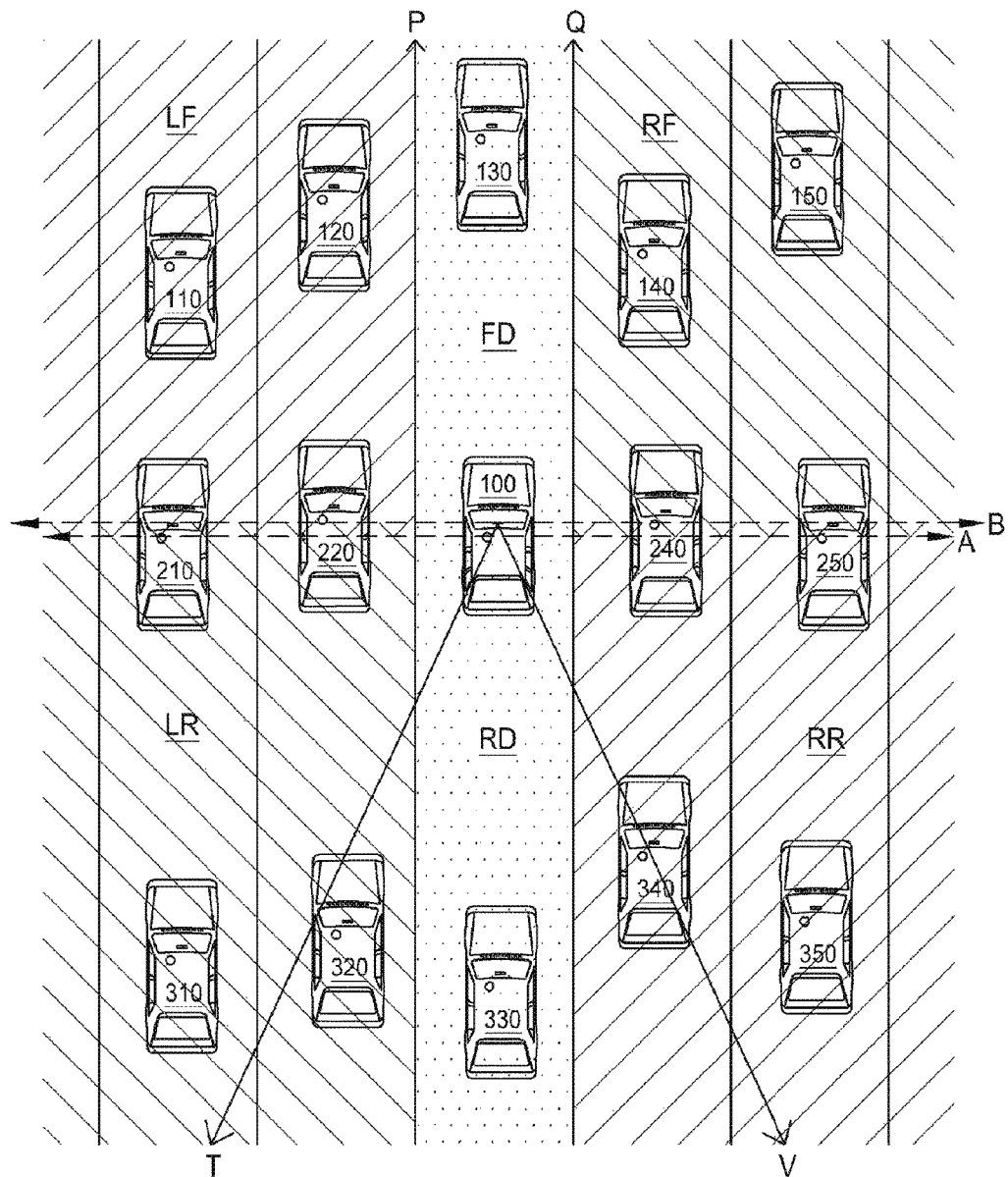
FIG. 6 illustrates another map of a roadway in relation to a 360 degree full awareness driving view, illustrating an orientation, location, and position with direction of the driver's vehicle by positioning with direction from the driver's perspective in relation with one or moving vehicles surrounding the driver's vehicle, and showing a visual positioning with direction orientation navigation map of the roadway from the driver's perspective.

FIGS. 2, 3 and 6 illustrate a visualization map of a roadway from the driver's perspective using the display 10. The 180 degree rear view RV of the display 10 can be combined with the 180 degree forward view FV of the driver to produce a 360 degree view of the surroundings of the vehicle 100. With respect to the 180 degree forward view, a driver peripheral vision line A is defined and is extended infinitely and laterally (e.g., in the left and right directions with respect to the vehicle 100) from the driver.

As illustrated in FIG. 6, a left forward field-of-view LF between lines A and P is the driving environment on the left side of the driver vehicle as seen with the naked eye through the front left-side window 103 and the front windshield 101 of the vehicle. A right forward field-of-view RF between lines A and Q is the driving environment on the right side of the driver vehicle as seen with the naked eye through the front right-side windows 105 and the front windshield 101 of the driver vehicle. A forward driving perspective view FD between lines P and Q (e.g., the driver's driving lane) is directly in front of the driver vehicle as seen with the naked eye through the front windshield 101 of the driver vehicle.

With respect to the 180 degree rearward view, a display viewing angle side line B is defined and is extended infinitely and laterally from the display 10. Using the mirror for the display 10 as an example, the display viewing angle side line B becomes the mirror viewing angle side line extended infinitely and laterally from the mirror. As illustrated, a left rearward field-of-view LR between lines B and T is the driving environment on the left side of the driver vehicle as seen through the rear left-side window 104 of the driver vehicle as an image on the display 10 (e.g., the image reflected in the mirror or generated by a rear-facing camera or other optical device). A right rearward field-of-view RR between lines B and V is the driving environment on the right side of the driver vehicle as seen through the rear right-side window 106 of the driver vehicle as an image on the display 10. A rearward driving perspective view RD between lines T and V is the driving environment directly behind the driver vehicle as seen through the rear windshield 102 of the driver vehicle as an image on the display 10.

For a convertible car with the top rolled down or a pickup truck, the image of the rear left corner 107 is shown between the left rearward field-of-view LR and the rearward driving perspective view RD, and the image of a rear right corner 108 is shown between the rearward driving perspective view RD and the right rearward field-of-view RR, as shown in FIG. 12.

When blending the 180 degree full rearward view with the seamless 180 degree full forward view, an overlapped vision portion 24 may be formed. For example, an overlapped vision portion 24 can be formed when the display 10 is positioned in front of (e.g., toward the front of the vehicle with respect to) the driver. The overlapped vision portion 24 is the duplicate field of view defined between the driver peripheral vision line A and the display viewing angle side line B, as shown in FIGS. 2, 3, and 6. The overlapped portion 24 can have a depth (e.g., the distance between side lines A and B) of at least 2 inches, at least 4 inches, at least 8 inches, at least 1 foot, and/or at least 1 yard. In some embodiments, the overlapped portion 24 can have a depth less than 3 inches, less than 6 inches, less than 1 foot, less than 2 feet, and/or less than 5 feet. The depth of the overlapped portion 24 can be between 1 inch and 6 inches, between 2 inches and 8 inches, between 3 inches and 1 foot, between 4 inches and 20 inches, between 1 foot and 3 foot, and/or between 6 inches and 4 feet. Many variations for the depth of the overlapped portion 24 are possible.

At the overlapped vision portion 24 in the 360 degree full awareness driving view, the driver is able to see the vehicle 100 at the duplicate field of view from the 180 degree rearward view and the seamless 180 degree forward view. In particular, when moving vehicles 210, 220, 240, 250 appear in the overlapped vision portion 24, as shown in FIGS. 3 to 5, the moving vehicles 210, 220, 240, 250 are visible in both the 180 degree rearward view RV and the seamless 180 degree forward view FV.

According to a preferred embodiment, the overlapped vision portion 24 includes a left overlapped portion and a right overlapped portion. The left overlapped portion is formed at an overlapped area between the left rearward field-of-view LR of the 180 degree rearward view and the left forward field-of-view LF of the seamless 180 degree forward view. The right overlapped portion is formed at an overlapped area between the right rearward field-of-view RR of the 180 degree rearward view and the right forward field-of-view RF of the seamless 180 degree forward view.

As illustrated in FIG. 6, the moving vehicle 210 is visible at the left forward field-of-view LF. The moving vehicle 210 is also visible at the left rearward field-of-view LR. However, the images of the moving vehicle at the 180 degree full rearward view and the seamless 180 degree full forward view are different. For example, the moving vehicle 210 will be seen from the front left side window 103 at the image on the display 10 and then from the front left side window 103 by the naked eyes of the driver.

Before the head (e.g., the front end) of the moving vehicle 210 enters at the overlapped vision portion 24, the driver will only see the moving vehicle 210 at the left rearward field-of-view LR of the seamless 180 degree rearward view. When the head of the moving vehicle 210 is positioned in the overlapped vision portion 24, as shown in FIG. 3, the driver will see the head of the moving vehicle 210 at the seamless 180 degree forward view and the tail (e.g., the rear end) of the moving vehicle 210 at the seamless 180 degree rearward view, as shown in FIGS. 4 and 5. When the moving vehicle 210 moves to a point where the tail of the moving vehicle 210 passes the overlapped vision portion 24, the driver will only see the moving vehicle 210 at the seamless 180 degree forward view. In some embodiments, the overlapped vision portion 24 enables the driver to see the same moving vehicle 210 with the naked eye and through the display 10 at the same time from the driver's perspective when driving, which creates a seamless 360 degree field-of-view of the roadway to the driver. In some embodiments, the overlapped vision portion 24 can help to reduce the likelihood that the driver gets lost in his driving environment around his car, especially when moving vehicles pass by the driver's vehicle 100.

As explained above, the display 10 can provide a seamless 180-degree rear view which can permit a driver to watch a vehicle as it passes: the driver can see the passing vehicle in a naked eye 180 degree forward view before the vehicle leaves the 180 degree rear view of the display 10. In some such embodiments, the visualization system, including the display 10, can reduce or eliminate blind spots. The display 10 can reflect or display a seamless 180-degree rearward-view driving environment with direction that complies with the linear-information processing characteristics of the human body senses, as explained in more detail below. Using the display 10 can reduce or eliminate visual distortion created by a convex mirror. In some embodiments, using the display 10 reduces or eliminates the multiple rear view mirrors systems and the standard exterior rear view mirrors technology. In some embodiments, the display allows a driver to see his or her vehicle's position and direction from his or her normal driving position inside the vehicle before seeing the driving environment outside of the vehicle through the mirror. Seeing the inside of the vehicle in combination with the driving environment can provide the driver with orientation by positioning the objects in the driving environment in contrast to the inside of the vehicle.

The visualization system of the present disclosure can further comprise a guidance arrangement 20. For example, as illustrated in FIGS. 4 and 5, the guidance arrangement 20 can be shown in both the 180 degree rearward view of the display 10 and in the seamless 180 degree forward view of the naked eye of the driver. The guidance arrangement 20 can facilitate determining the orientation, location, and position of the driver's vehicle 100 by positioning with direction from the driver's perspective in relation to one or moving vehicles surrounding the driver's vehicle.

In the 180 degree rearward field of view, the guidance arrangement 20 can comprise an automatic orientation guideline 21, an automatic location guideline 22, and/or an automatic position with direction guideline 23. The orientation guideline 21 shown in the 180 degree full rearward view can be image(s) of a body structure of the driver's vehicle. For example, the orientation guideline 21 can correspond with the windows 101, 102, 103, 104, 105, 106 of the driver's vehicle 100 (e.g., the body structure of the vehicle, as embodied as a sedan). The location guideline 22 can correspond to the driving lanes as viewed through the windows of the vehicle. The position with direction guideline 23 shown in the 180 degree full rearward view is the images of lane separation lines for pinpointing each and every moving vehicle's position with direction, including the driver's vehicle position within a known location.

For a convertible car with the top rolled down or for a pickup truck, the orientation guideline 21 and the location guideline 22 can be defined by the rear left and right corners 107, 108 of the vehicle displayed in the 180 degree full rearward view. While driving at night, the driver will see the lights from the moving vehicles at the 360 degree full awareness driving view instead of the vehicle images there.

The automatic orientation guideline 21 is arranged for preventing the driver from getting lost in his driving environment around his car. The automatic location guideline 22 is arranged for identifying other vehicles' locations in the 360 degree field-of-view driving environment. The automatic position guideline 23 is arranged for pinpointing each vehicle's position, including the driver's vehicle position and direction, allowing the driver's eyes to precisely track and pinpoint the position and direction of his vehicle and the position and direction of other moving vehicles around his vehicle to adjust and maintain the driver's vehicle position and direction properly and safely relative to the positions and directions of those vehicles moving surrounding his vehicle at any given moment. The 360 degree field-of-view provided by the display 10 and naked eye of the driver, as well as the guidelines 21, 22, 23, can reduce distractions for the driver. For example, the driver can observe the full 360 degree field-of-view while looking forward through the windshield of the vehicle, reducing the need for the driver to avert his or her eyes from the road when orienting him or herself with the vehicles and other obstacle surrounding the driver's vehicle. In some embodiments, the guidance arrangement 20 can facilitate alignment of the display 10. For example, the driver can line up the center point between the guidance arrangements 20 of the display (e.g., rearward) view with the center point of the forward view.

Orientation can be defined as the adjustment and maintenance of itself by an organism in its proper position and direction toward its environment. This is the way in which every organism survives. As an organism, our body senses its position by determining orientation as a result of the human body senses to adjust and maintain its position and direction properly toward its environment in all directions. Complying with the orientation determination requirements, adapting to the function characteristics of the human body senses, and relying on the differential ability of human sight warning of danger intuitively by positioning for survival to accomplish safe driving is known as orientation navigation by positioning with direction. As drivers, we adjust and maintain our vehicle's position and direction properly toward our driving environment in all directions, including the directions shown in the rearward-field-of-view-driving-environment shown in the display 10. Adjustment and maintenance of the vehicle's position may require us to see our vehicle's position and direction from our normal driving position and direction inside the vehicle in the first place before we see our driving environment outside the vehicle in all directions. As a result, it can be advantageous that the rear view mirror or display 10 be an interior rear view mirror or display. Desirably, the rearward view of the display includes a view of the driver position and, when the driver is sitting in the car, a view of the driver.

A 360 degree field-of-view driving environment can be required for orientation navigation by positioning with direction. The 360 degree field-of-view driving environment can be created by blending a 180 degree rearward field-of-view-driving-environment (e.g., provided by the display 10) with the driver's seamless 180 degree forward field-of-view driving environment.

The human body senses rely on the ability to observe differential positioning intuitively to avoid from harm. The capability of human sight to differentiate intuitively and properly an object from another, without resolving the precise details of the object, is known as the differential capability of human sight. Examples of this capability include distinguishing far from near without dealing with distance, fast from slow without dealing with speed, safety from danger intuitively without thought, and/or left from right and back from front without dealing with measurement. The differential capability of human sight holds each object as a frame of reference for another, enabling one to hold different objects as automatic guidelines for other objects. Humans often rely on the differential capability of human sight holding the position and direction as an automatic guideline to distinguish "Safety from Danger" in terms of "Safe or Not Safe" to warn of danger intuitively without thought, without measuring the distance of danger we cannot see due to the persistence-of-vision ability of human sight when driving. Drivers often rely on the-differential-ability-of-human-sight, holding position and direction as an automatic guideline distinguishing "Safety from Danger" and "Far Enough" from "Too Close" to avoid impact. No matter how steep the stairs are, for example, step by step, fast or slow, you safely get to the top of the stairs without the danger of falling from a misstep, you rely on the-differential-ability-of-human-sight distinguishing "Safety from Danger" in terms of "Safe or Not Safe" warning of danger, instead of visually measuring the real height of each stair you cannot see while walking due to the persistence-of-vision ability of human sight.

As shown in FIG. 6, a map of the roadway is illustrated as an example to demonstrate the orientation, location, and position of the driver's vehicle by positioning with direction from the driver's perspective. There are vehicles 110, 120, 130, 140, 150, 210, 220, 240, 250, 310, 320, 330, 340, and 350 positioned surrounding the driver vehicle 100. The automatic orientation guideline 21 through the 360 degree full awareness driving view can help the driver to determine the orientation of the driver's vehicle 100 in his driving environment around the driver's vehicle 100.

The automatic location guideline 22 will help the driver for identifying each and every vehicle's location in the 360 degree full awareness driving view by positioning.

As illustrated in FIGS. 6 and 7, the driver will see two moving vehicles 110, 120 at the left forward field-of-view LF, the moving vehicle 130 at the forward driving perspective view FD, and two moving vehicles 140, 150 at the right forward field-of-view RF. In addition, four moving vehicles 210, 220, 240, 250 are located at the overlapped vision portion 24 that the driver is able to see the moving vehicles 210, 220, 240, 250 at the duplicate field of view. In particular, the driver will see the heads of the moving vehicles 210, 220, 240, 250 at the seamless 180 degree forward view.

With respect to the 180 degree rearward view, the driver will see, through the display 10, the moving vehicle 310 and partial moving vehicle 320 at the left rearward field-of-view LR. The driver will see, through the display 10, another partial moving vehicle 320, the moving vehicle 330, and partial moving vehicle 340 at the rearward driving perspective view RD. The driver will also see, through the display 10, another partial moving vehicle 340 and the moving vehicle 350 at the right rearward field-of-view RR. In other words, all the moving vehicles 110, 120, 130, 140, 150, 210, 220, 240, 250, 310, 320, 330, 340, and 350 surrounding the driver's vehicle 100 will be seen.

The position guideline 23 can help the driver to pinpoint each vehicle's position via the lane separation lines. As shown in FIG. 6, there are five driving lanes, as an example, and the driver's vehicle 100 is located in the third driving lane. In fact, the display 10 can cover more than five driving lanes. The lane separation lines can be the position guideline 23 to pinpoint the moving vehicles 110, 120, 130, 140, 150 located at the fifth to first driving lanes respectively through the seamless 180 degree forward view. The lane separation lines can also be the position guideline 23 to pinpoint the moving vehicles 310, 320, 330, 340, 350 located at the fifth to first driving lanes respectively through the 180 degree rearward view. The lane separation lines can also be the position guideline 23 to pinpoint the moving vehicles 210, 220, 240, 250 located at the fifth, fourth, second, and first driving lanes respectively through both of the seamless 180 degree forward view and the 180 degree rearward view. In other words, through the 360 degree full awareness driving view, all the moving vehicles 110, 120, 130, 140, 150, 210, 220, 240, 250, 310, 320, 330, 340, and 350 surrounding the driver's vehicle 100 can be pinpointed at different driving lanes.

An example of a safety rule is that it is safe for you to change or merge to a spot in a driving lane within a side-window of your car, if no vehicle or other obstacle is in or is moving into that same spot. It is not safe for you to change or merge if someone/something is in or is moving into that same spot.

Figure 9:
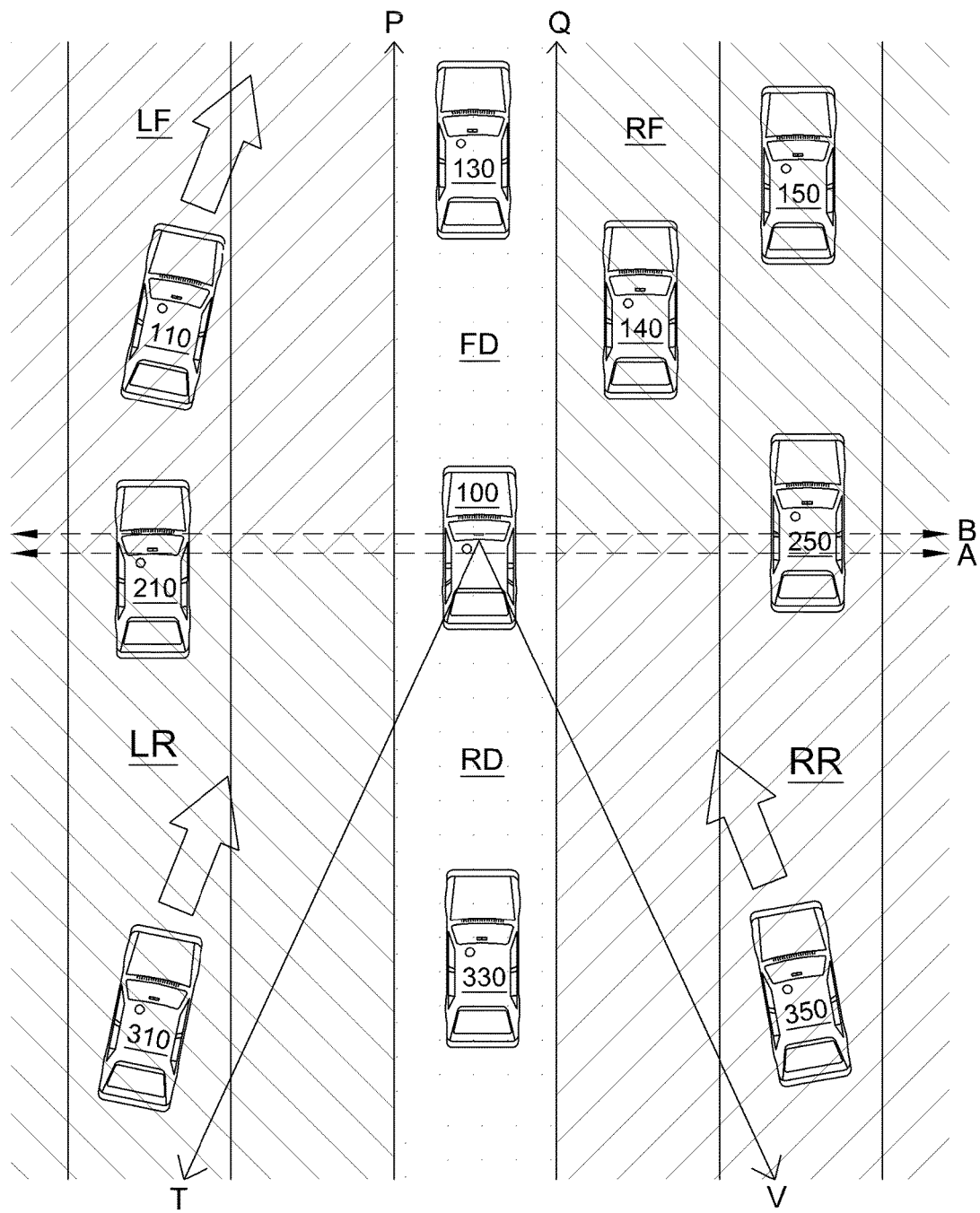
FIG. 9 illustrates another map of roadway in relation to the seamless 360 degree full awareness driving view, illustrating the driver vehicle making a lane change.

For example, in FIGS. 9 to 11, through the 360 degree full awareness driving view, the orientation and location of the driver's vehicle 100 is identified to change lanes from the third driving lane to either the fourth or second driving lane. As shown in FIG. 10, the driver can see the moving vehicle 130, 140, 150 in front of the driver's vehicle 100 not moving into the spot the driver wants. However, the driver can observe, through the display 10, the moving vehicle 350 heading toward to the same spot as the driver wants, as shown in FIG. 11. As a result, it is unsafe for the driver to change lane from the third driving lane to the second driving lane with respect to the moving vehicle 350.

Furthermore, the moving vehicle 310 appears at the left rearward field-of-view LR two lanes away from the third diving lane where the driver's vehicle locates. When the driver sees, through the display 10, the moving vehicle 310 not moving to the fourth lane, it is safe for the driver to change lane from the third driving lane to the fourth driving lane. Otherwise, when the driver sees the moving vehicle 310, through the display 10, heading toward the fourth driving lane from the fifth driving lane, as shown in FIG. 11, the moving vehicle 310 may move to the same spot as the driver wants. As a result, it is unsafe for the driver to change lane from the third driving lane to the fourth driving lane with respect to the moving vehicle 310. It is worth mentioning that the driver is able to see all the moving vehicles around the driver's vehicle 100 moving from spots to spots through the 360 degree full awareness driving view.

In some embodiments, the display 10 (e.g., a mirror or convex mirror) displays, from the perspective of the driver viewing position, two lanes to the left of the vehicle in the left rearward field-of-view LR within 30 feet rearward of the display 10, within 40 feet rearward of the display 10, within 50 feet rearward of the display, and/or within 20 feet rearward of the display 10. In some embodiments, the display 10 (e.g., a mirror or convex mirror) displays, from the perspective of the driver viewing position, two lanes to the right of the vehicle in the right rearward field-of-view RR within 30 feet rearward of the display 10, within 40 feet rearward of the display 10, within 50 feet rearward of the display, and/or within 20 feet rearward of the display 10. In some embodiments, the display 10 (e.g., a mirror or convex mirror) displays, from the perspective of the driver viewing position, two lanes to the left of the vehicle in the left rearward field-of-view LR within 20 feet to 60 feet rearward of the display, within 30 feet to 50 feet rearward of the display 10, and/or within 25 feet to 45 feet rearward of the display 10. In some embodiments, the display 10 (e.g., a mirror or convex mirror) displays, from the perspective of the driver viewing position, two lanes to the right of the vehicle in the right rearward field-of-view RR within 20 feet to 60 feet rearward of the display, within 30 feet to 50 feet rearward of the display 10, and/or within 25 feet to 45 feet rearward of the display 10.

Using conventional mirrors, when the driver sees the moving vehicle 110 not moving to the fourth lane from the fifth lane, the driver will turn his or her head for a "shoulder check" to confirm there is no vehicle at the blind spot of the driver's vehicle before the driver changes the lane. If the vehicle 310 is not moving to the fourth lane, the driver may think that it is safe to change the lane. However, at the time when the driver turns his head for a "shoulder check" to see his or her blind spot, the moving vehicle 110 may simultaneously move to the fourth lane. As a result, the driver 100 will move the driver's vehicle 100 to the fourth lane and may cause a collision with the moving vehicle 110.

In other words, when the head of the driver turns, the driver may lose the forward driving view. Even though it might take only a few seconds to turn the head back and to gain the forward driving view, an accident might occur within such a short head turning period of time. In view of the present disclosure, the driver is not required to turn his or her head for a shoulder check because the driver can see the 360 degree full awareness driving view in front of the driver.

The visual positioning with direction orientation navigation system immerses the driver in a 360-degrees-full-awareness-driving-environment by positioning at any given moment. For example, the navigation system can permit a driver to look between the 180 degree forward view and the 180 degree rearward view in only a fraction of a second (e.g., in less than the time of one blink of an eye). In some cases, rapid transition between the forward view and the rearward view can enable the driver to perceive, decide and take action for safe driving to avoid crashes. It is noted that the vision solution to the driver of the present disclosure reduces or eliminates the vision impairments (e.g., blind spots) and the eye distractions (e.g., significant eye movement between the forward and rearward views which may necessitate refocusing of the driver's eyes) for the driver which create the eye distractions solution to the driver, while seeing the causes of crashes all at the same time at any given moment during driving. When that happens, the driver would take action to alter the effect, and avoid crashes intuitively and without thought in the first place as a result of the differential capability of human sight. Orientation and the function of the human body senses for survival do not enter into the conventional safe driving concept and rear view technology at all.

The visual positioning with direction orientation navigation system translates the artificial driving environment reflected in the rear view mirror (e.g., the display 10) into the driver's real-world driving environment complying with the definition of orientation and adapting to the function of the human body senses for survival, which can ensure that drivers can use the rear view mirror system effectively, safely and timely for safe driving. Like the artificial driving environment image of a movie that is flashed on a screen, to the human body senses for survival under orientation, the driving environment reflected in the rear view mirror accounts for an artificial driving environment to the function of the human body senses for survival under orientation because the driver is not physically present in the mirror's view driving environment that defies the orientation determination requirements and works against the function of the human body senses for survival where the human body senses cannot respond intuitively when driving. The 180-degree rearward field-of-view driving environment displayed in the display 10 of the present disclosure teaches a field-of-view driving environment common to the driver's seamless 180-degree full forward field-of-view. The rearward field-of-view driving environment in the mirror automatically extends into the area of the driver's vision in the driver's forward field-of-view which naturally duplicates the same scene in the diver's forward field-of-view, which enables the driver to see the same vehicle with the naked eye and through the display 10. In some embodiments, synchronizing the forward and rearward views as described above complies with the definition of orientation and adapts the function of the human body senses for survival. The same road scene of the field-of-view driving environment duplicated by the mirror's view and the driver's vision translates the rearward field-of-view driving environment reflected in the mirror's view into the driver's real-world driving environment which creates a 360 degree full field-of-view driving environment from the driver's perspective when driving.

The visual positioning with direction orientation navigation system can reduce or eliminate the misconception of the distance judgment capability of human sight for safe driving by distancing based on description and prediction of the laws of physics which the driver cannot see and measure with the naked eye or through any kind of mirror when driving. The image on the retina of the eye must come to rest from $1/50$ to $1/25$ of a second, depending on the brightness of the image, regardless of the size of the image. This after-image proves that the image distance of a moving vehicle we see with the naked eye or through any kind of display device is not the current distance of the moving vehicle but the distance $\frac{1}{50}$ to $\frac{1}{25}$ of a second earlier.

The retina continues to perceive an image after the object of the image has been removed. The ability of the eye to retain an image is known as persistence-of-vision. Peter Mark Roget, the author of the famous Roget Thesaurus, discovered this afterimage. While images are transmitted continuously and rapidly enough on the retina, our eyes retain each image long enough to build up a constant overlap and give us the illusion of continuous motion in conflict with what is seen and felt, which enables us to enjoy movies and television. It is because of persistence-of-vision we are unable to separate clearly and completely a series of rapidly changing images with the naked eye or through a mirror. For example, a movie consists of a rapid series of still pictures that are flashed on a screen, with about $\frac{1}{60}$ of a second of complete darkness after each image. But persistence-of-vision fills in the dark moment mixing each picture perfectly with the one that went before to create the illusion of continuous motion. Persistence-of-vision accounts for our failure to notice the dark moment that come after each image of a motion picture.

On the other hand, while the eyes are in motion, they cannot see an object clearly. For example, the eyes are unable to separate clearly and completely the individual cross-ties firmly planted on the ground underneath in a running train by failing to see the distance between the cross-ties, which accounts for the eyes in motion in a running train or moving vehicle. In addition, our eyes are unable to see the precise details of a swiftly moving object. For example, a television image is just one bright, little dot, which sweeps the screen fast enough so that our eyes retain the images long enough to build up a complete picture. Your eyes are unable to separate, clearly and completely, the individual spokes of a running bicycle wheel, which accounts for your failure to notice each distance between the spokes of the running bicycle wheel. Thus, your eyes are unable to see clearly and completely the current distance of a running bicycle that you cannot measure by the naked eye or through any kind of mirror, because the closing distance of the running bicycle that you see is built up by a series of spoke distances of the running bicycle wheels in rapid succession.

When car wheels turn faster than bicycle wheels, we are unable to see the current distance of a swiftly moving vehicle. A moving vehicle runs over every inch, even every fraction of an inch in rapid succession of the distance traveled, where each inch corresponds to an individual distance in a series of rapidly changing images. At 65 mph, for instance, it is 1,144 inches per second and $\frac{1}{25}$ of a second, corresponds to a distance consisting of a series of 46 individual inches in rapid succession, not to mention a fraction of an inch in rapid succession of the distance traveled. Your eyes retain each image of the individual inches long enough to fail to notice the next consecutive 46 individual inches that come after $\frac{1}{25}$ of a second, which creates a blind spot you did not know exists that increases your reaction time. You would drive over 46 inches at 65 mph before you ever saw the danger in front of you $\frac{1}{25}$ of a second ago.

As explained above, we cannot see the complete darkness after each image of a movie in $\frac{1}{60}$ of a second, or each frame of the movie would be seen as independent, distinct, and still pictures. At 65 mph, $\frac{1}{60}$ of a second corresponds to a distance consisting of a series of 19 individual inches in rapid succession. Your eyes retain each image of the 19 individual inches long enough to fail to notice the next 18 individual inches that come after $\frac{1}{60}$ of a second, which creates a blind spot you do not even know exists that increases your reaction time. You would drive over 18 inches in $\frac{1}{60}$ of a second before you ever saw the danger in front of you. At times, for instance, cars seem to appear from nowhere. Similarly, each corresponding number of the magnitude of the individual inches of distance the car traveled as seen on the odometer of your car would overlap and run together that is not countable by the naked eye, if the numbers on the odometer were to indicate inches indicating the current distance of moving vehicles. In order to shun the illusions produced by persistence-of-vision, consequently the numbers on the existing odometer indicate miles (kilometers) rather than inches (centimeters), which indicate only the distance the car traveled, but not the current distance of the moving car. It shows that to use the naked eye to measure the current distance of the moving vehicle for safe driving is to use persistence-of-vision to produce illusions in conflict with what is seen and felt to measure the distance the human eye cannot see when driving. It further shows that to use the image distance of the moving vehicle formed in any kind of mirror, including the plane mirror, to measure the current distance of the moving vehicle is to use persistence-of-vision to produce illusions in conflict with what is seen and felt to measure the distance the human eye cannot see through any kind of rear view mirror when driving. The persistence-of-vision characteristic of the human eye does not enter into the conventional safe driving concept and rearview technology at all.

The visual positioning with direction orientation navigation system can reduce or eliminate the misinterpretation of the definition of distance under the conventional safe driving concept by distancing forcing drivers to visually measure the distance they cannot see with the naked eye when driving. Distance is defined as the extent or amount of space between two things, two lines, two points, two surfaces, etc. Accordingly, as a driver, the distance between your vehicle at the back and another vehicle in the front is the distance from the surface of the front bumper of your vehicle to the surface of the rear bumper of the other vehicle. The distance between your vehicle in the front and the other vehicle at the back is the distance from the surface of the rear bumper of your vehicle to the surface of the front bumper of the other vehicle. The distance between your vehicle and another vehicle on the left side of your vehicle is the distance from the surface of the left outside of your vehicle to the surface of the right outside of the other vehicle. And the distance between your vehicle and another vehicle on the right side of your vehicle is the distance from the surface of the right outside of your vehicle to the surface of the left outside of the other vehicle. However, you can never see the front bumper, rear bumper, left outside and right outside of your vehicle from your normal driving position and direction inside your vehicle, including physically turning your head and looking over your shoulder. That is, you can never see the distance between your vehicle and other moving vehicles around your vehicle that you cannot measure when driving. It is proven that the conventional safe driving concept by distancing forces drivers to visually measure the distance between two things (let's say two vehicles) by seeing only one of them against the definition of distance and beyond the capabilities of human sight.

The visual positioning with direction orientation navigation system can reduce or eliminate the misinterpretation and misuse of the characteristics of the image distance of a vehicle formed in the plane mirror to measure the distance between a vehicle and the driver's vehicle through the plane mirror in order to comply with the distance judgment capabilities of human sight requirements under the conventional safe driving concept and rear view technology based on the laws of physics when driving. According to the characteristics of the image distance of an object formed by the plane mirror based on the laws of physics, the image distance of an object behind the plane mirror from the image to the surface of the mirror is equal to the object distance in front of the plane mirror from the object to the surface of the mirror. Accordingly, the image distance of a vehicle that you see through the plane rear view mirror in your vehicle is equal to the distance between the surface of the mirror and the vehicle but not the distance between your vehicle in the front and the vehicle at the back from the surface of the rear bumper of your vehicle to the surface of the front bumper of the vehicle at the back. In addition, you cannot see the rear bumper of your vehicle through the plane mirror in your vehicle, including the plane interior and exterior mirrors. Moreover, the driver cannot see the real distance between his vehicle and the moving vehicle around his vehicle through the plane mirror due to illusions produced by the persistence-of-vision characteristics of the eye when driving. If we were able to see the current distance of moving vehicles through a plane mirror when driving, we would have seen each distance of the fast, bright, little dot sweeping on the television screen, the television image would be seen as just one bright, little dot through the plane mirror. We would have seen the complete darkness after each image of a movie frame, each frame of the movie would be seen as independent, distinct, and still pictures through the plane mirror.

The visual positioning with direction orientation navigation system can reduce or eliminate the multi-mirror-system rear view technology based on the description and prediction of the laws of physics. More mirrors achieve greater field of view which meets the driver vision enhancement requirements based on description and prediction of the laws of physics. Characteristically, the human body senses process information linearly. That is why we cannot concentrate on two distinct tasks at one time. No matter how well we adjust and align all multiple rear view mirrors, our eyes are incapable of focusing on multiple distinct mirrors at multiple locations in multiple directions at one time. Simply, human sight can see only one single mirror at one location in one direction at a time. Whatever the combination feature of the views the multi-mirror-system rear view technology promised, a driver cannot benefit from it blinded. The multi-mirror-system design and performance rear view technology leaves blind spots in the driver's rearward field-of-view that shatters the 180-degree rearward field-of-view. In addition, head turns checking for blind spots left by the multi-mirror-system and glance duration created by checking multiple mirrors that take the driver's eyes off of the road ahead create a new blind spot in the driver's forward field-of-view. The blind spot in the driver's forward field-of-view can shatter the driver's existing seamless 180-degree forward filed-of-view, resulting in blind spots. Glance duration, head turning, and/or blind spots can become permanent vision impairments and eye distractions to the driver that can inhibit or prevent creation of the 360-degree full field-of-view driving environment. The linear-information-processing characteristic of the human body senses does not enter into the conventional safe driving concept and rear view technology at all.

The visual positioning with direction orientation navigation system can eliminate standard exterior mirror design. Drivers are keenly aware of the effects of spatial disorientation from getting lost in their mirror's view, if they cannot see their vehicle's position and direction appearing in their rear view mirror, including the plane mirror and the convex mirror for determining orientation when driving. Orientation requires us to see our vehicle's position and direction from our normal driving position inside the vehicle in the first place before we see our driving environment outside the vehicle. On the contrary, drivers using standard mirrors have to determine their orientation from their driving environment reflected in their exterior mirrors outside the vehicle toward their driving position and direction.

The visual positioning with direction orientation navigation system can eliminate the exterior mirrors on the vehicle. Eliminating the external mirrors can reduce the oil consumed by vehicles. Reducing oil consumption can reduce some of the environmental impacts of oil consumption, such as global warming and increased arable land use for roadways and parking space. Eliminating the exterior mirrors by immersing the driver in a 360-degrees-awareness driving environment by positioning would decrease the wind resistance and weight of the vehicle that substantially and automatically decreases fuel consumption, and reduces greenhouse gas emissions $CO_2$ and downgrades global warming. In some cases, eliminating external mirrors can reduce the width of the vehicle's body, which can greatly decrease roadways and parking spaces land use, reducing competition between vehicles and crops for farmland.

The visualization system of the present disclosure can permit a driver to see whether something is in a specific location (e.g., spot) or not, from a quick glance in a fraction of a second. More particularly, the visualization system of the present disclosure can permit a driver to see whether an obstacle (e.g., vehicle) is in or is moving into the same spot the driver wants in that lane in a multiple lanes driving environment around the driver's vehicle within that window (e.g., the front window, the left-side-windows, or the rear window or the right-side-windows) of the driver's vehicle from a quick glance at the mirror of the present disclosure in less time than a half of a second. Quick observation of the obstacles surrounding the driver's vehicle can allow the driver to precisely track and pinpoint the position and direction of his or her vehicle visually and the position and direction of other moving vehicles around the driver's vehicle in order to adjust and maintain the driver's vehicle position and direction properly and safely relative to the positions and directions of those other vehicles.

Figure 1A:
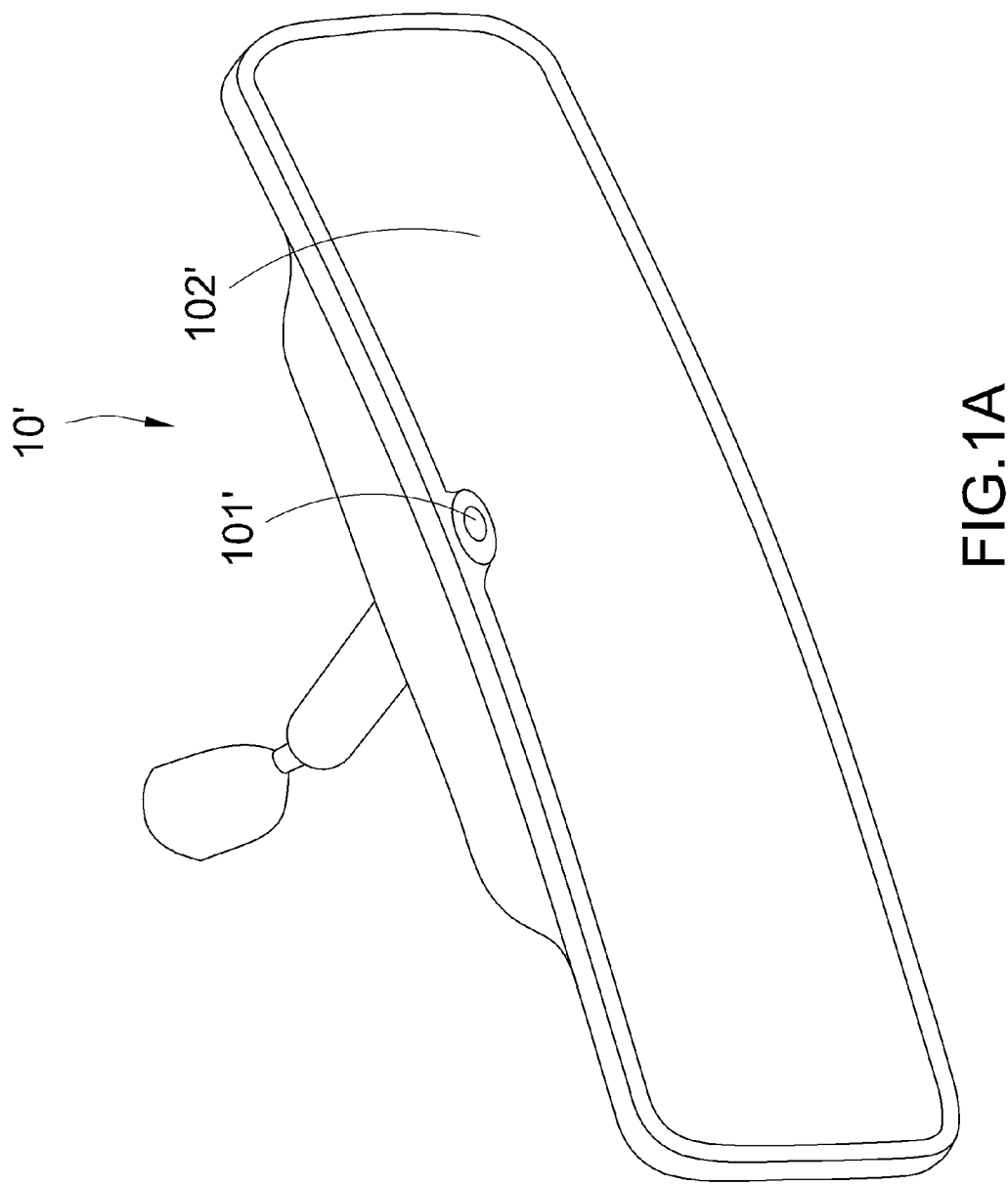
FIG. 1A is a perspective view of another embodiment of a visual positioning with direction orientation navigation system.

FIG. 1A illustrates an embodiment of the display 10', wherein the display 10' comprises an interior image capturing device 101' capturing the 180 degree rearward view in live manner. The display 10' can include a display 102' for displaying the 180 degree rearward view from the interior image capturing device 101'. The image capturing device 101' can comprise a camera installed at the interior of the vehicle and adapted to capture the 180 degree rearward view in live manner. In some embodiments, the image capturing device 101' is positioned behind or in line with the driver of the vehicle. In some embodiments, the image capturing device 101' is positioned in front of the driver. The display means 102' can comprise a LED, LCD, or other screen for displaying the 180 degree rearward view captured by the interior image capturing device 101'. The display 102' can also be a projector for projecting the 180 degree rearward view from the interior image capturing device 101' onto the front windshield of the vehicle.

In some instances, drivers do not trust electronic instrumentation for fear of system failures. For example, a driver may not fully trust a camera-monitor system for visualizing the surroundings of a vehicle. Drivers' fear is often based on the knowledge that one cannot know if an electronic system fails until it has already failed. In some cases, electronic warning systems and/or camera systems can require signal processing time (e.g., 1-2 seconds) which can create warning delays and can create dangerous information delays for the driver of a vehicle. For example, a vehicle traveling at 65 miles per hour will travel approximately 190 feet in 2 seconds. Thus, a warning delay of 2 seconds can present a potentially dangerous situation for a driver driving a vehicle at high speeds.

In some cases, it can be advantageous to use a display 10 that is a mirror (e.g., a convex mirror). Such a mirror system may reduce the likelihood that the driver of the vehicle loses trust in the visualization system.

Although the visualization systems have been disclosed in the context of certain preferred embodiments and examples, it will be understood by those skilled in the art that the present disclosure extends beyond the specifically disclosed embodiments to other alternative embodiments and/or uses of the visualization systems and obvious modifications and equivalents thereof. In addition, while a number of variations of the visualization system have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed visualization systems. Thus, it is intended that the scope of the present disclosure herein disclosed should not be limited by the particular disclosed embodiments described above, but should be determined only by a fair reading of the claims that follow.

What is claimed is:

1. A visualization system for a vehicle comprising:
   a display device attached to a portion of the vehicle in front of a driver viewing position, the display device having a width, the display device having a height less than a height of a windscreen of the vehicle, the display device having a display portion facing the driver viewing position;
   wherein the display device displays an at least 180° rearward view that is defined by an arc spanning at least 180° and a vertex point of the arc is positioned forward of the driver viewing position, wherein the at least 180° rearward view overlaps an at least 180° forward view from the driver viewing position and wherein the at least 180° rearward view is undistorted, seamless and without breaks.

2. The visualization system of claim 1, further comprising an image capturing device attached to a portion of the vehicle, the image capturing device configured to capture a 180° seamless view of an environment rearward of the display device.

3. The visualization system of claim 2, wherein the image capturing device is connected to the display device.

4. The visualization system of claim 2, wherein the image capturing device is a camera.

5. The visualization system of claim 1, wherein the display device is a convex mirror.

6. The visualization system of claim 1, wherein the at least 180° rearward view is perpendicular to a centerline of the vehicle.

7. The visualization system of claim 1, wherein the display device is attached to the windscreen of the vehicle.

8. The visualization system of claim 1, wherein, from the driver viewing position, the display device is configured to display at least one driving lane on a left side of the vehicle and at least one driving lane on a right side of the vehicle.

9. The visualization system of claim 8, wherein, from the driver viewing position, the display device is configured to display at least two driving lanes on the left side of the vehicle behind the display and at least two driving lanes on the right side of the vehicle behind the display.

10. The visualization system of claim 1, wherein, from the driver viewing position, the display device is configured to display a position and a direction of travel of vehicles behind and adjacent to the vehicle to which the display device is attached.

11. The visualization system of claim 10, wherein it is safe for the driver to move the driver's vehicle into a target position in an adjacent lane when no other vehicle is shown in the display, from the driver viewing position, to be positioned in or to be entering into the target position in the adjacent lane.

12. The visualization system of claim 1, wherein, from the driver viewing position, the display device displays:
   a right rearward view defined between a right edge of a rear window of the vehicle as displayed in the display device and a viewing direction rightward of and lateral to the display device;
   a left rearward view defined between a left edge of a rear window of the vehicle as displayed in the display device and a viewing direction leftward of and lateral to the display device; and
   a rearward driving perspective view between the left rearward view and the right rearward view.

13. A visualization system for a vehicle comprising:
   a convex mirror attached to a portion of the vehicle in front of a driver viewing position, the convex mirror having a width, the convex mirror having a height less than a height of a windscreen of the vehicle, the convex mirror having a reflective surface facing the driver viewing position;
   wherein the reflective surface displays an at least 180° view that is defined by an arc spanning at least 180° and a vertex point of the arc is positioned forward of the driver viewing position; and
   wherein the at least 180° view is undistorted, seamless and without breaks.

14. The visualization system of claim 13, wherein the convex mirror has a constant radius of curvature.

15. The visualization system of claim 13, wherein the convex mirror is mounted to an interior of the windscreen of the vehicle.

16. The visualization system of claim 13, wherein the convex mirror is mounted above the driver viewing position.

17. A visualization system for a vehicle comprising:
   a display device inside of the vehicle, the display device having a width, the display device having a height less than a height of a windscreen of the vehicle, the display device having a display portion facing a driver viewing position;
   wherein the display portion displays an at least 180° rearward view that is defined by an arc spanning at least 180° and a vertex point of the arc is positioned forward of the driver viewing position; and
   wherein the at least 180° rearward view is undistorted, seamless and without breaks.

18. The visualization system of claim 17, wherein the at least 180° rearward view of an environment rearward of the display device overlaps an at least 180° forward view from the driver viewing position.

19. The visualization system of claim 17, wherein the display device is positioned in front of the driver viewing position.

20. The visualization system of claim 19, wherein the at least 180° rearward view rearward of the display device includes a view of the driver of the vehicle.

21. The visualization system of claim 19, wherein the at least 180° rearward view rearward of the display device includes a portion of an interior of the vehicle.

22. A method of preventing collisions between a vehicle and its surrounds, the method comprising:
   attaching a display device to a portion of a vehicle in front of a driver viewing position, the display device having a height less than a height of a windscreen of the vehicle and a width; and
   orienting the display device to produce an at least 180° rearward view that is defined by an arc spanning at least 180° and a vertex point of the arc is positioned forward of the driver viewing position, and wherein the at least 180° rearward view and an at least 180° forward view from the driver viewing position together form a 360° driving view, wherein the at least 180° rearward view is undistorted, seamless and without breaks.

23. The method of claim 22, wherein the display device is a convex mirror.

24. A method of creating a seamless 360 degree full awareness driving environment for a driver, comprising the steps of:
   displaying a seamless 180 degree full rearward view in front of the driver on a display device at an interior of a driver's vehicle, wherein the at least 180° rearward view is defined by an arc spanning at least 180° and a vertex point of the arc is positioned forward of a driver viewing position, and wherein the at least 180° rearward view is undistorted, seamless and without breaks;
   blending the seamless 180 degree full rearward view with a seamless 180 degree full forward view from the driver viewing position to form a seamless 360 degree full awareness driving view with respect to the driver viewing position; and
   through the seamless 360 degree full awareness driving view, determining an orientation, location, and position of the driver's vehicle by positioning from the driver viewing position perspective in relation with one or more moving vehicles surrounding the driver's vehicle, such that, from the driver viewing position, the driver is able to precisely track and pinpoint the position and a direction of the driver's vehicle and a position and a direction of each and every other moving vehicle around the driver's vehicle in order to visually maintain and adjust the driver's vehicle position and direction properly and safely relative to the positions and the directions of the moving vehicles surrounding the driver's vehicle for safe driving.

25. The method of claim 24, wherein blending the seamless 180 degree full rearward view with the seamless 180 degree full forward view from the driver viewing position further comprises a step of forming an overlapped vision portion for the seamless 360 degree full awareness driving view when blending the seamless 180 degree full rearward view with the seamless 180 degree full forward view, such that when the moving vehicle appears at the overlapped vision portion, the moving vehicle is visible in both the seamless 180 degree full rearward view and the seamless 180 degree full forward view.

26. A visual positioning orientation navigation system for a driver's vehicle, comprising:
   a display adapted for mounting at an interior of the vehicle at a position in front of a driver thereof, the display displaying a seamless 180 degree full rearward view for being viewed by the driver in the driver's vehicle and for blending with a seamless 180 degree full forward view from a driver viewing position to form a seamless 360 degree full awareness driving view with respect to the driver, wherein the at least 180 ° rearward view is defined by an arc spanning at least 180 ° and a vertex point of the arc is positioned forward of the driver viewing position and wherein the at least 180 ° rearward view is undistorted, seamless and without breaks; and
   a guidance arrangement shown in the seamless 180 degree full rearward view at the display for determining an orientation, location, and position of the driver's vehicle by positioning from the driver viewing position in relation with one or more moving vehicles surrounding the driver's vehicle;
   wherein the driver is able to precisely track and pinpoint the position of the driver's vehicle and a position of every other moving vehicle around the driver's vehicle in order to visually maintain and adjust the driver's vehicle position properly and safely relative to the positions of moving vehicles surrounding the driver's vehicle for safe driving.

27. The system of claim 26, wherein the guidance arrangement includes an overlapped vision portion for the seamless 360 degree full awareness driving view when blending the seamless 180 degree full rearward view with the seamless 180 degree full forward view from the driver viewing position, such that the overlapped vision portion is adapted for enabling the moving vehicle being visible in both the seamless 180 degree full rearward view and the seamless 180 degree full forward view when the moving vehicle appears in the overlapped vision portion.

* * * * *